(12) United States Patent
Doi et al.

(10) Patent No.: US 7,776,145 B2
(45) Date of Patent: Aug. 17, 2010

(54) INK, INK SET, RECORDING METHOD, INK CARTRIDGE, AND RECORDING DEVICE

(75) Inventors: Takatsugu Doi, Ebina (JP); Yoshimi Tokita, Ebina (JP); Eisuke Hiraoka, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1106 days.

(21) Appl. No.: 11/448,480

(22) Filed: Jun. 7, 2006

(65) Prior Publication Data

US 2007/0146454 A1 Jun. 28, 2007

(30) Foreign Application Priority Data

Dec. 22, 2005 (JP) .............................. 2005-371011

(51) Int. Cl.
*C09D 11/02* (2006.01)
(52) U.S. Cl. .................................. 106/31.6; 106/31.75
(58) Field of Classification Search ................ 106/31.6, 106/31.75
See application file for complete search history.

(56) References Cited

U.S. PATENT DOCUMENTS 6,802,893 B1 * 10/2004 Komatsu et al. ........... 106/31.6
2005/0219341 A1 * 10/2005 Nito et al. ................... 347/100

FOREIGN PATENT DOCUMENTS

| JP | 5-339532 | 12/1993 |
| JP | 8-253719 | 10/1996 |
| JP | 2001-89686 | 4/2001 |
| JP | 2003-206421 | 7/2003 |

* cited by examiner

*Primary Examiner*—Jerry Lorengo
*Assistant Examiner*—Veronica Faison Gee
(74) *Attorney, Agent, or Firm*—Fildes & Outland, P.C.

(57) ABSTRACT

The present invention provides an ink comprising at least a pigment, water, a water-soluble organic solvent, a lithium ion and one or more of cation other than the lithium ion, which can be applied particularly favorably for an inkjet method; an ink set at least comprises the ink and/or a processing solution containing at least an aggregating agent; a recording method and a recording device using the ink set in which the ink and the processing solution are applied so as to contact with each other to form an image onto a recording medium.

22 Claims, 4 Drawing Sheets

INK, INK SET, RECORDING METHOD, INK CARTRIDGE, AND RECORDING DEVICE

CROSS-REFERENCE TO RELATED APPLICATION

This application claims priority under 35 USC 119 from Japanese Patent Application No. 2005-371011, the disclosure of which is incorporated by reference herein.

BACKGROUND

1. Technical Field

The present invention relates to an ink, an ink set, a recording method, an ink cartridge and a recording medium. More specifically, the invention relates to an ink, an ink set, a recording method, an ink cartridge and a recording medium favorably used in an inkjet recording process.

2. Related Art

An inkjet recording system in which ink is ejected from an ink ejecting device which comprises a nozzle, a slit or a porous film has been widely used in printers due to its small size and popular price. In particular, a piezo inkjet system in which ink is ejected utilizing the mechanism of the deformation of a piezoelectric device, and a thermal inkjet system in which ink is ejected utilizing the mechanism of the boiling phenomenon of the ink caused by thermal energy, are characterized by their excellent resolution and high-speed printing property.

Generally, known inks include an aqueous ink containing water as the principal solvent component, and an oil-based ink containing an organic solvent as the principal solvent component. However, it is known that there are problems such as solidification of a colorant in the ink, which is caused by the water used for the solvent of the aqueous ink vaporizing over time, due to its high vapor pressure.

Especially in the case of ink for an inkjet recording system, the diameter of the nozzle for ejecting the ink is small, and changes in conditions of the ink tend to greatly affect the ejecting property of the ink. For this reason, if the printing head is filled with the ink and left for a long period of time, water evaporates from the tip of the nozzle, causing a problem of clogging in the nozzle. As a result, there are cases in which ink cannot be ejected, or the ink will be ejected in a swerved manner, leading to deterioration in image quality.

In particular, from the viewpoint of preventing the nozzle from clogging when the ink is subjected to long-term storage, in a case where the ink has a high pigment concentration, no satisfactory solution has been provided by such methods so far.

SUMMARY OF THE INVENTION

In view pf the above-mentioned circumstances, the present invention provides an ink, an ink set, a recording method, an ink cartridge and a recording device.

According to an aspect of the invention, there is provided an ink containing at least a pigment, water, a water-soluble organic solvent, a lithium ion and one or more of cation other than the lithium ion.

BRIEF DESCRIPTION OF THE DRAWINGS

Embodiments of the present invention will be described in detail based on the following figures, wherein.

DETAILED DESCRIPTION

Figure 1:
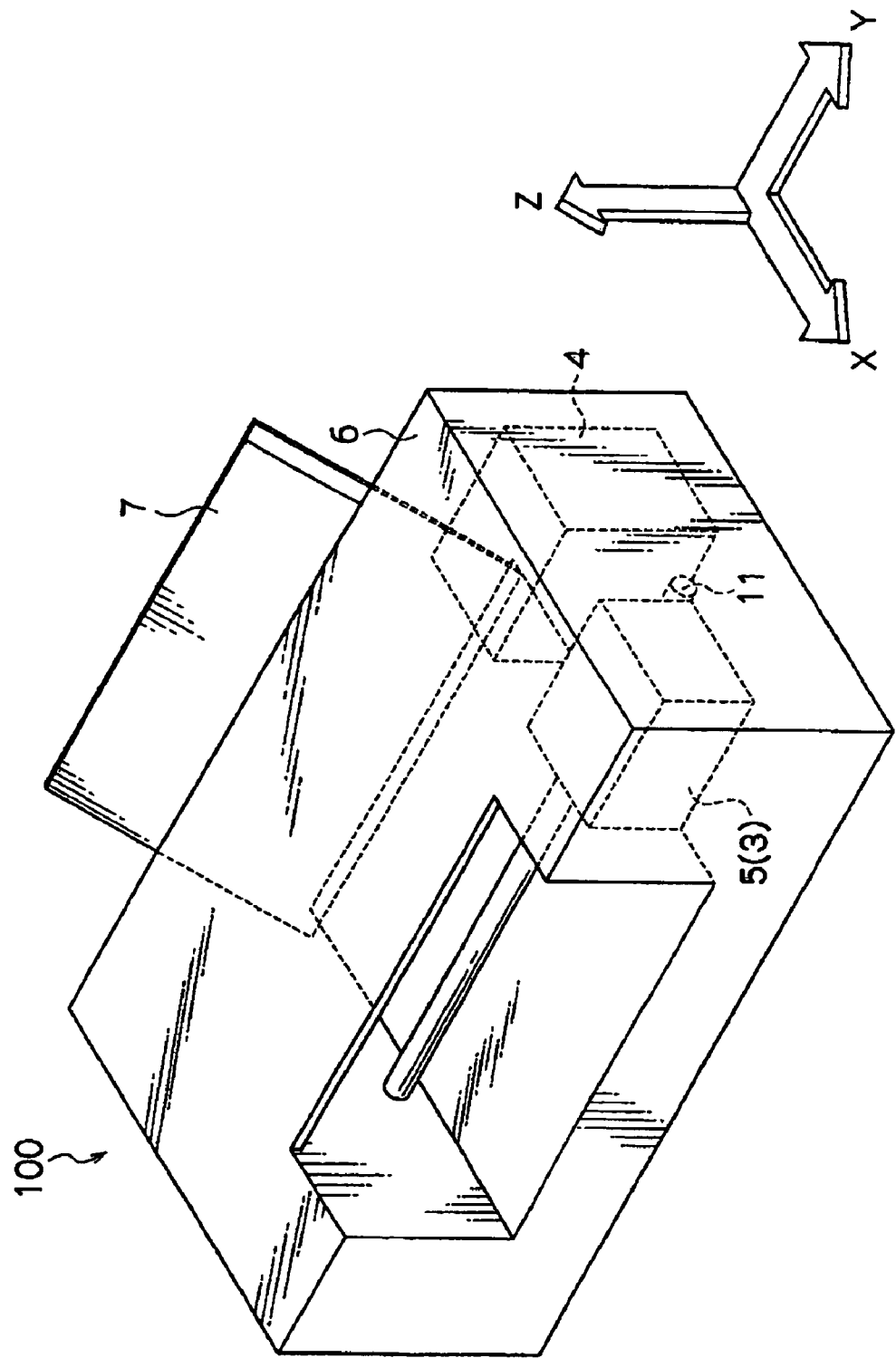
FIG. 1 is a perspective view showing the external configuration of a preferable embodiment of an inkjet recording device of the present invention.

The present invention will be described in detail in the following.

Hereinafter, the term "to" between two numerical values indicates a range which includes the two values as the minimum and the maximum.

[Ink]

For the purpose of preventing aggregation of a pigment when ink is subjected to long-term storage, the ink of the present invention includes a lithium ion as a counter ion.

The lithium ion improves dissolving property of a pigment dispersant, so that the pigment can be prevented from aggregating. Furthermore, the lithium ion, having a large hydration potential, has a high water retention capacity so that a certain amount of the water contained in the ink can be retained even if the water vaporizes in the course of long-term storage.

However, it was found that the ink ejection becomes unstable at the initial stage of printing, if no counter ion other than the lithium ion is included in the ink. Such trouble is presumed to be caused by the reduction of the amount of free water in the ink due to the high water retention capacity of the lithium ion.

On the other hand, it was found that the ink ejection property after long-term storage may be lowered when the amount of the lithium ion is small. Such trouble is presumed to occur because of the aggregation of the pigment caused by the small amount of the water retained as the water in the ink vaporizes.

To overcome such troubles, the inventors of the present invention have closely studied and found an effective solution in which at least one cation other than a lithium ion is used as a counter ion. In this way, along with improving jetting property of a nozzle by the presence of the lithium ion which retains a constant amount of the water contained in the ink to restrain the ink from aggregating after long-term storage, the condition of ink ejection at the initial stage after the ink is prepared is stabilized by including at least one cation other than the lithium ion. Since it is considered that the cation other than the lithium ion also serves to supplement the absolute amount of the counter ion required to restrain the pigment from aggregation, it is presumed that the cation also contributes to improve ejection property of the ink after long-term storage.

The above-mentioned presumption does not limit the functions of the lithium ion and the cation other than the lithium ion used in the present invention, since such functions have not been exactly clarified. At any rate, an ink containing at least a pigment, water, a water-soluble organic solvent, a lithium ion and one or more of cation other than the lithium ion suffices as an ink of the present invention.

The present invention will herein be described in detail.

The ink of the present invention contains at least a pigment, water, a water-soluble organic solvent, a lithium ion and one or more of cation other than the lithium ion.

The ink of the invention contains two or more cations; a lithium ion and one or more of cation other than the lithium ion.

—Lithium Ion—

A lithium ion may be in any form of the structure, e.g. a lithium hydroxide, a hydrate of a lithium hydroxide (the number of water molecules to be hydrated with is not particularly limited), a lithium acetate, a lithium benzoate, a lithium chloride, a lithium bromide, a lithium citrate, a lithium dihydrogen phosphate, a lithium lactate, a lithium nitrate, a lithium oxalate, a lithium salicylate and a lithium tartrate, when to be added, as long as it exists as a lithium ion in an ink.

The ratio of the content of the lithium ion to the content of a pigment is preferably 0.001 to 5% by mass, more preferably 0.002 to 2.5% by mass, and further preferably 0.005 to 1% by mass. In a case where the content of the lithium ion is less than 0.001% by mass, the water retention effect of the lithium ion may not be acquired and clogging may occur when the ink is subjected to long-term storage. On the other hand, in a case where the content of the lithium ion is more than 2% by mass, the pigment may not be stably dispersed in a freshly produced ink or an ink at the initial stage of storage because of the amount of retained water being too large.

—Cation Other than Lithium Ion—

Examples of the cation other than a lithium ion are not particularly limited, but preferably a monovalent cation, more preferably an alkali metal ion or a monovalent organic cation.

The alkali metal ion is preferably a sodium ion and a potassium ion, in terms of the dispersion stability of the pigment. It is presumed that these cations are capable of promoting dissociation of a soluble group which exists on the surface of the pigment and improves dispersion stability of the pigment.

The monovalent organic cation is preferably a primary, secondary, tertiary, or a quaternary amine, e.g. a tetraalkyl ammonium, an alkyl amine, a benzalconium, an alkyl pyrridium, an imidazorium, and a derivative or a salt thereof.

Specific examples of the monovalent oragnic cation include an amyl amine, a butyl amine, a propanol amine, a propyl amine, an ethanol amine, an ethyl ethanol amine, a 2-ethyl hexyl amine, an ethyl methyl amine, an ethyl benzyl amine, an ethylene diamine, an octyl amine, an oleyl amine, a cyclooctyl amine, a cyclobutyl amine, a cyclopropyl amine, a cyclohexyl amine, a diisopropanol amine, a diethanol amine, a diethyl amine, a di(2-ethyl hexyl)amine, a diethylene triamine, a diphenyl amine, a dibutyl amine, a dipropyl amine, a dihexyl amine, a dipentyl amine, a 3-(dimethyl amino) propyl amine, a dimethyl ethyl amine, a dimethyl ethylene diamine, a dimethyl octyl amine, a 1,3-dimethyl butyl amine, a dimethyl-1,3-propane diamine, a dimethyl hexyl amine, an amino-butanol, an amino-propanol, an amino-propane diol, a N-acetyl amino ethanol, a 2-(2-amino ethyl amino)-ethanol, a 2-amino-2-ethyl-1,3-propane diol, a 2-(2-amino ethoxy) ethanol, a 2-(3,4-dimethoxy phenyl)ethyl amine, a cetyl amine, a triisopropanol amine, a triisopentyl amine, a triethanol amine, a trioctyl amine, a trityl amine, a bis(2-amino ethyl)1,3-propane diamine, a bis(3-amino propyl) ethylene diamine, a bis(3-amino propyl)1,3-propane diamine, a bis(3-amino propyl)methyl amine, a bis(2-ethyl hexyl)amine, a bis(trimethylsilyl)amine, a butyl amine, a butyl isopropyl amine, a propane diamine, a propyl diamine, a hexyl amine, a pentyl amine, a 2-methyl-cyclohexyl amine, a methyl-propyl amine, a methyl benzyl amine, a monoethanol amine, a lauryl amine, a nonyl amine, a trimethyl amine, a triethyl amine, a dimethyl propyl amine, a propylene diamine, a hexamethylene diamine, a tetraethylene pentamine, a diethyl ethanol amine, a tetramethyl ammonium hydroxide, a tetramethyl ammonium chloride, a tetraethyl ammonium bromide, a dihydroxy ethyl stearyl amine, a 2-heptadecenyl-hydroxy ethyl imidazoline, a lauryl dimethyl benzyl ammonium chloride, a cetyl pyrridinium chloride, a stearamide methyl pyrridium chloride.

Preferable examples thereof include a tetra methyl ammonium hydroxide and an alkanol amine. The tetramethyl ammonium hydroxide and the alkanol amine have a high affinity with an after-mentioned polymer dispersant, whereby the dissociation of the polymer ionizer is promoted to stabilize the pigment dispersion.

The cations other than a lithium ion exemplified herein may be used alone or in combination of two or more.

The molar ratio between the content of the lithium ion and the content of other cation(s) is preferably 1:50 to 15:1, more preferably 1:25 to 12.5:1, and further preferably 1:1 to 10:1. In a case where the content of the lithium ion is smaller than in a case where the above-mentioned ratio is 1:50, the water retention effect of the lithium ion may not be acquired and clogging may occur in the course of long-term storage. On the other hand, in a case where the content of the lithium ion is larger than in a case where the above-mentioned ratio is 15:1, dispersion property of a pigment may not be stabilized in an ink at the initial stage after preparation because of the amount of retained water in the ink being too large.

—Pigment—

Either organic or inorganic pigment may be used in the present invention. A self-dispersing pigment, a pigment dispersed using a polymer dispersant and a colored particle in which a colored resin is dispersed, are preferably used.

Examples of a black pigment include a carbon black pigments such as a furnace black, a lamp black, an acetylene black and a channel black. In addition to the black pigment and three-primary-color pigments of cyan, magenta and yellow, pigments of particular color such as red, green, blue, brown or white, and pigments of metallic color such as gold or silver, may be used. Pigment which is newly synthesized for the present invention may also be used.

Examples of a black pigment used in the present invention include, but not limited to, Raven7000, Raven5750, Raven5250, Raven5000 ULTRAII, Raven3500, Raven2000, Raven1500, Raven1250, Raven1200, Raven1190 ULTRAII, Raven1170, Raven1255, Raven1080 and Raven1060 (all manufactured by Columbian Carbon); Regal1400R, Regal330R, Regal660R, Mogul L, Black Pearls L, Monarch 700, Monarch 800, Monarch 880, Monarch900, Monarch1000, Monarch1100, Monarch1300 and Monarch1400 (all manufactured by Cabbot); Color Black FW1, Color Black FW2, Color Black FW2V, Color Black 18, Color Black FW200, Color Black S150, Color Black S160, Color Black S170, Printex35, PrintexU, PrintexV, Printex140U, Printex140V, Special Black6, Special Black5, Special Black4A and Special Black4 (all manufactured by Degussa); and No. 25, No. 33, No. 40, No. 47, No. 52, No. 900, No. 2300, MCF-88, MA600, MA7, MA8, and MA100 (all manufactured by Mitsubishi Chemical Co., Ltd.).

Examples of a cyan pigment include, but not limited to, C.I.Pigment Blue-1, -2, -3, -15, -15:1, -15:2, -15:3, -15:4, -16, -22 and -60.

Examples of a magenta pigment include, but not limited to, C.I.Pigment Red-5, -7, -12, -48, -48:1, -57, -112, -122, -123, -146, -168, -184 and -202.

Examples of a yellow pigment include, but not limited to, C.I.Pigment Yellow-1, -2, -3, -12, -13, -14, -16, -17, -73, -74, -75, -83, -93, -95, -97, -98, -114, -128, -129, -138, -151, -154 and -180.

Pigment which is self-dispersible in water, having a large number of water-solubilizing groups on the surface thereof to be stably dispersed in water without a polymer dispersant, may be used in the present invention. To be more precise, a pigment which is self-dispersible in water is obtained by subjecting a conventional so-called pigment to surface modifying treatment such as acid/base treatment, coupling agent treatment, polymer graft treatment, plasma treatment and oxidation/reduction treatment.

In addition to the above-mentioned pigments which have been subjected to surface modifying treatment, commercially available self-dispersible pigments, e.g. Cab-o-jet-200, Cab-o-jet-250, Cab-o-jet-260, Cab-o-jet-270, Cab-o-jet-300, IJX-444, and IJX-55 (all manufactured by Cabot), and Microjet Black CW-1, and CW-2 (all manufactured by Orient Chemical Industries, Ltd.) may also be used as a pigment which is self-dispersible in water.

A pigment called a microcapsule pigment, which is coated with a resin, may also be used in the present invention. Examples of a microcapsule pigment include commercially available microcapsule pigments manufactured by Dainippon Ink & Chemicals, Inc. and Toyo Ink MFG Co., Ltd., or the like, as well as the microcapsule pigments prepared for the present invention.

A so-called colored particle wherein a resin colored with a dye or a pigment is dispersed may also be used in the present invention.

The amount of a colorant used in the present invention relative to the total amount of the ink is 1 to 25% by mass, preferably 4 to 22.5% by mass, and more preferably 7.5 to 20% by mass. In a case where the amount of the colorant in the ink is less than 1% by mass, the optical density may not be sufficiently obtained, while in a case where the amount of the colorant in the ink is more than 25% by mass, ejection property of the ink may become instable to cause clogging in a nozzle after long-term storage.

<Dispersant>

For the purpose of dispersing the colorant, a dispersant such as a nonionic compound, an anionic compound, a cationic compound, an ampholytic compound and the like, which is preferably a polymer dispersant, may be used for the present invention.

For example, copolymers of monomers having an $\alpha,\beta$-ethylene unsaturated group can be used as the above-mentioned dispersant. Examples of the monomer having an $\alpha,\beta$-ethylene unsaturated group include an ethylene, a propylene, a butene, a pentene, a hexene, a vinyl acetate, an aryl acetate, an acrylic acid, a methacrylic acid, a crotonic acid, a crotonic ester, an itaconic acid, an itaconic acid monoester, a maleic acid, a maleic acid monoester, a maleic acid diester, a fumaric acid, a fumaric acid monoester, a vinyl sulfonic acid, a styrene sulfonic acid, a vinyl naphthalene sulfonate, a vinyl alcohol, an acrylamide, a methacryloxyethyl phosphate, a bis-methacryloxyethyl phosphate, a methacryloxyethyl phenyl acid phosphate, an ethylene glycol dimethacrylate, a diethylene glycol dimethacrylate, a styrene, an $\alpha$-methylstyrene, a styrene derivative e.g. a vinyl toluene, a vinyl cyclohexane, a vinyl naphthalene, a vinyl naphthalene derivative, an acrylic acid alkylester, a phenyl acrylate, an alkyl methacrylate, a phenyl methacrylate, a cycloalkyl methacrylate, an alkyl crotonate, a dialkyl itaconate, a dialkyl maleinate and a derivative thereof.

The copolymer obtained by copolymerizing one or more kinds of monomer having an $\alpha,\beta$-ethylene unsaturated group may be used as a polymer dispersant. Specific examples of the copolymer include a styrene-styrene sulfonate copolymer, a styrene-maleic acid copolymer, a styrene-methacrylic acid copolymer, a styrene-acrylic acid copolymer, a vinylnaphthalene-maleic acid copolymer, a vinylnaphthalene-methacrylic acid copolymer, a vinylnaphthalene-acrylic acid copolymer, an alkyl acrylate-acrylic acid copolymer, an alkyl methacrylate-methacrylic acid copolymer, a styrene-alkyl acrylate-acrylic acid copolymer, a styrene-alkyl methacrylate-methacrylic acid copolymer, a styrene-phenyl methacrylate-methacrylic acid copolymer and a styrene-cyclohexyl methacrylate-methacrylic acid copolymer, a polystyrene, a polyester and a polyvinyl alcohol.

The weight-average molecular weight of the polymer dispersant used for an ink of the present invention is preferably in the range of 3,000 to 50,000, more preferably 3,500 to 40,000, and further preferably 4,000 to 30,000. In a case where the molecular weight of the dispersant is less than 3,000, a pigment may not stably dispersed, while in a case where the molecular weight of the dispersant is more than 50,000, the viscosity of the liquid may increase so that the discharging property may be deteriorated.

The above-mentioned weight-average molecular weight is measured in accordance with gel permeation chromatography (GPC), using HLC-8120GPC, SC-8020 (manufactured by Toso Corp.); two of TSK gel, super HM-H (manufactured by Toso Corp., 6.0 mm ID×15 cm) as the columns; a THF (tetrahydrofuran) as an eluant; at the specimen concentration of 0.5%; flow rate of 0.6 ml/min; sample injection amount of 10 μL; measurement temperature of 40° C.; using an IR detecting device.

A calibration line is obtained from 10 samples of "polystyrene standard specimen TSK standard"(manufactured by Toso Corp.): "A-500", "F-1", "F-10", "F-80", "F-380", "A-2500", "F-4", "F-40" and "F-128", "F-700".

The acidic value of the polymer dispersant used in the ink of the present invention is preferably 50 to 400, more preferably 60 to 250, and further preferably 70 to 200. In a case where the acidic value of the dispersant is less than 50, the pigment may not be stably dispersed. On the other hand, in a case where the acidic value is more than 400, ink viscosity may be increased and ejecting property may be deteriorated.

To measure the acidic value of the polymer, a known method e.g. a method based on the JIS K0070 may be used. Specifically, the acidic value can be measured by conducting a neutralization titration using a neutralizing agent (KOH) with a resin dissolved in an organic solvent such as a THF or a toluene.

Additionally, the neutralization degree of the polymer dispersant used in an ink of the present invention is preferably 20 to 100%, more preferably 30 to 90%, and further preferably 40 to 80%. In a case where the neutralization degree of the dispersant is less than 20%, the pigment at the initial stage after the ink is prepared may not be stably dispersed. On the other hand, in a case where the neutralization degree is more than 100%, the ejection property of the ink after the long-term storage, as well as the ink at the initial stage after the ink is prepared, may be deteriorated.

The neutralization degree can be calculated in accordance with the following formula wherein the measurement result of the above-mentioned acidic value is used;

Neutralization degree=neutralizing agent by weight (g)/resin by weight (g)/neutralizing agent by molecular weight/(acidic value/56,100)

Ratio of the content of a dispersant to be added to the content of a pigment is preferably in the range of 1 to 100% by mass, preferably 2.5 to 75% by mass, and more preferably 5 to 50% by mass. In a case where the above-mentioned ratio is more than 100% by mass, ink viscosity may be increased and ejection property of the ink may become unstable. On the other hand, in a case where the above-mentioned ratio is less than 1% by mass, the dispersibility of the colorant may be lowered.

Volume-average particle size of the colorant particle is preferably 30 to 250 nm, more preferably 60 to 250 nm, and further preferably 150 to 230 nm. Volume-average particle size of the particle indicates the particle size of the pigment itself, or the size of the particle to which an additive such as a dispersant is stuck, in a united manner, if any.

To measure the volume-average particle size of the particle, 4 ml of ink is put in a measuring cell and measured in accordance with the predetermined measuring method using Microtrack UPA Grading Analyzer 9340 (manufactured by Leeds & Northrup Co., Ltd.) in the present invention. As for the parameter to be input, ink viscosity is used for a viscosity; and density of a pigment is used for density of a dispersed particle. In a case where the volume-average particle size of the particle in the ink is less than 30 nm, an optical density may be reduced. On the other hand, in a case where the volume-average particle size is more than 250 nm, dispersion stability may not be obtained.

<Solvent>

—Water—

Water used for an ink of the present invention may be any of tap water, distilled water, ion-exchange water, pure water or ultra-pure water, preferably distilled water, ion-exchange water, pure water and ultra-pure water, and more preferably an ion-exchange water, a pure water and an ultra pure water are used, from the viewpoint of the storage stability of the ink and the prevention of clogging, In the present invention, the ratio of the content of the water in the ink is preferably 30 to 80% by mass, more preferably 35 to 70% by mass, and further preferably 40 to 60% by mass. In a case where the water content is less than 30% by mass, the ejection property of the ink at the initial stage after the ink is prepared may be deteriorated. On the other hand, in a case where the water content is more than 80% by mass, the occurrence of the nozzle clogging after the long-term storage may become more frequent.

—Water-Soluble Organic Solvent—

Water-soluble organic solvent may be contained in the ink of the present invention.

Any type of a water-soluble organic solvent may be used without any particular limitation, but it is preferable that the solubility parameter (SP value) of the water-soluble organic solvent (when the single kind of water-soluble organic solvent is used) or the SP value of the water-soluble organic solvent mixture (when two or more kinds of water-soluble organic solvent are used in combination) is preferably 13 to 25, more preferably 13 to 20, and further preferably 15 to 20. In a case where the SP value is less than 13, the above-mentioned polymer dispersant may be dissolved to increase ink viscosity, causing the frequent occurrence of nozzle clogging in the course of long-term storage. On the other hand, in a case where a solvent having a SP value of 25 or more, although such a solvent does not actually exist, dispersion stability of the pigment may be lowered.

Specific examples of the water-soluble organic solvent include a derivative of polyhydric alcohol, an alkyl ether thereof or the like; e.g. a glycerine, a polyethylene glycol, a polypropylene glycol, a diethylene glycol, a diethylene glycol monobutyl ether, a diethylene glycol phenyl ether, a propylene glycol, a propylene glycol monomethyl ether, a butylene glycol, a triethylene glycol, a thiodiethanol, a hexylene glycol, an ethylene glycol, an ethylene glycol methyl ether, a diethylene glycol methyl ether, a pentane diol, a hexane diol (e.g. a 1,2-hexane diol), a hexane triol, a trimethylol propane and a diglycerine ethylene oxide adduct. These examples can be used either alone or in a combination of two or more thereof.

Furthermore, alcohols such as a methyl alcohol, an ethyl alcohol, a n-propyl alcohol, an isopropyl alcohol, a n-butyl alcohol, a hexyl alcohol and a benzyl alcohol; amides such as a dimethyl formamide and a dimethyl acetamide; ketones and ketoalcohols such as an acetone and a diacetone alcohol; nitrogen containing solvents having a high boiling point such as a triethanol amine, a diethanol amine, a pyrrolidone, a N-methyl-2-pyrrolidone, and a 1,3-dimethyl-2-imidazolydinone; sulfur containing solvents such as a dimethyl sulfoxide, a diethyl sulfoxide, a sulforan, and a thiodiethanol; saccharides and derivatives thereof such as a glucose, a maltose, an amirose (dextrin), a cellulose and a sodium alginate; a gum Arabic or the like can also be used although the present invention is not limited thereto. These water-soluble organic solvents may be used alone or in combination of two or more.

The content of the water-soluble organic solvent related to the total content of the above-mentioned liquid composition is preferably 1 to 50% by weight, more preferably 3 to 30% by weight. In a case where the content of the water-soluble organic solvent is less than 1% by mass, the high-speed drying property may be deteriorated. On the other hand, in a case where the content is more than 50% by mass, ink viscosity may be increased to affect ejection stability.

The method to calculate the solubility parameter (SP value) of the water-soluble organic solvent may be any one of; method in which the SP value is calculated from the measured values, e.g. a vaporization heat, a refractive index, a kauri-butanol value, a surface tension; method in which the SP value is calculated from a chemical composition.

The SP value used in the present invention is a value calculated from the Fedors method, in which the SP value is calculated from the vaporization energy of an atom or an atomic group ($\Delta ei$) and a mole volume ($\Delta vi$) of the chemical structure.

$$[SP \text{ value}=(\Sigma\Delta ei/\Sigma\Delta vi)^{1/2}]$$

The above-mentioned organic solvents may used alone or in combination of two or more.

<Other Additives>

A surfactant may be added in the ink of the present invention. Examples of the surfactant include a nonionic surfactant, an anionic surfactant, or an amphoteric surfactant. Additionally, an anionic surfactant, cationic surfactant, an amphoteric surfactant, and a nonionic surfactant, and further the above-mentioned dispersants may also used.

Examples of the nonionic surfactants include polyethylene glycol-based surfactants, e.g. a higher alcohol alkylene oxide adduct, an alkylphenol alkylene oxide adduct, a fatty acid alkylene oxide adduct, a polyvalent alcohol fatty acid ester alkylene oxide adduct, a fatty acid amide alkylene oxide adduct and a polyalkylene glycol alkylene oxide adduct; and polyvalent alcohol-based surfactants, e.g. a glycerol fatty acid ester, a polyvalent alcohol alkylether and an alkanolamine fatty acid amides.

Specific examples of the nonionic surfactant include a polypropyleneglycol-ethylene oxide adduct, a polyoxyethylene nonylphenyl ether, a polyoxyethylene octylphenyl ether, a polyoxyethylene dodecylphenyl ether, a polyoxyethylene alkyl ether, a polyoxyethylene fatty acid ester, a sorbitan fatty acid ester, a polyoxyethylene sorbitan fatty acid ester, a fatty acid alkylolamide, an acetyleneglycol, an acetyleneglycol-oxyethylene adduct, an aliphatic alkanolamide, a glycerin ester and a sorbitan ester.

Examples of the anionic surfactant include a carboxylate salt, a sulfate ester salt, a sulfonic acid, a phoshate salt; e.g. an alkylbenzene sulfonate, an alkylphenyl sulfonate, an alkylnaphthalene sulfonate, a higher fatty acid salts, a sulfate ester salt of higher fatty acid esters, a sulfonate of higher fatty acid esters, a sulfate ester salt or a sulfonate of higher alcohol ethers, a higher alkyl sulfosuccinate, a higher alkyl phosphate ester salt and a phosphate ester salts of higher alcohol-ethylene oxide adducts.

Additional effective examples include a dialkylsulfo succinate, an alkylsulfonate, a dodecylbenzene sulfonate, an alkylbenzene sulfonate, an isopropylnaphthalene sulfonate, a monobutylphenylphenol sulfonate, a monobutylphenyl sulfonate, a monobutylbiphenyl sulfonate and a dibutylphenylphenol disulfonate.

Examples of the amphoteric surfactant include a carboxylate salt-based surfactant such as an amino acid-based surfactant and a betaine-based surfactant; a sulfate ester-based surfactant, a sulfonic acid-based surfactant, a phosphoric ester-based surfactant.

Other examples thereof such as an alanine-based surfactant, an amidopropylbetaine-based surfactant, a sulfobetaine-based surfactant, an amidoamine oxide-based surfactant and an imidazoline-based surfactant; e.g. an alkylbetaine, a sulfobetaine, a sulfate betaine, an imidazolidone betaine, an amidopropylbetaine and an aminodipropionate salt may also be used.

Examples of the cationic surfactant include a tetraammonium alkyl salt, an alkylamine salt, a benzalkonium salt, an alkyl pyridium salt and an imidazolium salt; e.g. a dihydroxyethyl stearylamine, a 2-heptadecenyl-hydroxyethyl imidazoline, a lauryldimethylbenzyl ammonium chloride, a cetylpyridium chloride and a stearamide methylpyridium chloride.

A bio-surfactant such as a spicrispolic acid, a rhamnolipid and a lysolecithin may also be used.

In the present invention, the surfactant may be used alone or in combination of two or more. The content of the surfactant relative to the total amount of the ink is preferably less than 10% by mass, more preferably 0.01 to 5% by mass, and further preferably 0.1 to 3% by mass, when used in the present invention. In a case where the content of the surfactant is more than 10% by mass, the optical density and the storage stability of the ink may be deteriorated.

An additive such as an antioxidant, an antifungal agent, a conductive agent, an ultraviolet ray absorbing agent, a chelating agent and the like, may optionally be used in the present invention. Any known additives may be used in the present invention, e.g. as the chelating agent, an ethylene diamine tetraacetate (EDTA), an imino diacetate (IDA), an ethylene diamine-di(o-hydroxy phenyl acetate) (EDDHA), a nitrilotriacetate (NTA), a dihydroxy ethyl glycine (DHEG), a trans-1,2-cyclohexanie diamine tetraacetate (CyDTA), a diethylene triamine-N,N,N',N'',N''-pentaacetate (DTPA), a glycol ether diamine-N,N,N',N'-tetraacetate (GEDTA).

<Property of the Ink>

The ink of the present invention is preferably used as an inkjet ink for a system wherein the ink is applied by an inkjet method. In the inkjet method, the ink may not properly be ejected when a viscosity of the ink is high.

The viscosity of ink as an inkjet ink is preferably 1 to 50 mPa·s, more preferably 1.2 to 50 mPa·s, and further preferably 1.5 to 30 mPa·s. In a case where the viscosity of the ink is more than 50 mPa·s, the ink may not properly be ejected.

The above-mentioned surfactants, polyalcohols, monohydric alcohols and the like may preferably be added to adjust the surface tension of the ink of the present invention.

The surface tension of the ink of the present invention is preferably 20 to 40 mN/m, more preferably 20 to 35 mN/m, and further preferably 25 to 35 mN/m. In a case where the surface tension of the ink is less than 20 mN/m, the ejection property of the ink at the initial stage after the preparation may be deteriorated; in a case where the surface tension of the ink is more than 40 mN/m, the ink may become slower in the speed to permeate into a paper and dry, which may result in a low productivity due to the lack of adaptability to the high-speed printing.

<Preparation Method for the Ink>

An example of a method to prepare the ink will herein be described.

When the ink of the present invention is an ink containing a pigment dispersed by the above-mentioned resin, the ink can be obtained by the following process; for example, adding a predetermined amount of the above-mentioned pigment in an aqueous solution containing a predetermined amount of the above-mentioned resin (dispersant); sufficiently agitating the solution; conducting the dispersion using a dispersing machine; eliminating coarse particles by conducting the centrifugal separation or the like; agitating the solution as the predetermined amount of the above-mentioned water-soluble organic solvent, the above-mentioned additive or the like is added; conducting the filtration. A process wherein the pigment is preliminarily dispersed at a high concentration to be diluted at the time the ink is prepared may also be used. The method may include a process of pulverizing the pigment before the dispersing process. Alternatively, the method in which a predetermined amount of water-soluble organic solvent, water and a dispersant is mixed, then a pigment is added and dispersed using a dispersing machine may be used.

As the above-mentioned dispersing machine, commercially available ones can be used; e.g. a colloid mill, a flow-jet mill, a slasher mill, a high-speed disperser, a ball mill, an attritor, a sand mill, a sand grinder, a ultra-fine mill, an Aigar motor mill, a Dyno mill, a pearl mill, an agitator mill, a cobol mill, a three-bar roll, a two-bar roll, an extruder, a kneader, a micro fluidizer, a laboratory homogenizer, an ultrasonic homogenizer. These machines can be used alone or in combination of two or more. To prevent the inorganic impurity being mixed in, it is preferable to use a dispersing method without using a dispersion medium. In this case, it is preferable to use a micro fluidizer, an ultrasonic homogenizer or the like.

Additionally, in the case of the ink wherein the above-mentioned self-dispersible pigment is used, the method such as subjecting the pigment to a surface modification; adding the obtained pigment into the water; agitating the composition sufficiently; conducting the dispersion using the above-mentioned dispersing machine if necessary; eliminating the coarse particles conducting centrifugal separation or the like; adding a predetermined amount of a solvent, an additive or the like to the composition; subjecting the composition to an agitation, a mixing and a filtration.

[Ink Set]

The ink set of the present invention is not particularly limited, as long as it comprises the above-mentioned ink. The ink set may either comprise two or more kinds of ink, or comprise a processing solvent containing at least an aggregating agent and the above-mentioned ink.

<Processing Solution>

Details of a processing solution used in an inkjet recording method of the present invention are herein described.

The processing solution used in the present invention contains at least an aggregating agent. Each component thereof is described as below.

—Aggregating Agent—

The aggregating agent used in the present invention is a substance which has an effect to react or interact with a component in the ink to increase the viscosity or cause the aggregation. Examples of such substance include a polyvalent metal ion and a cationic substance; specifically, substance such as an inorganic electrolyte, an organic amine compound and an organic acid, as described below, are effectively used.

Examples of an inorganic electrolyte include salts of an alkali metal ion such as a lithium ion, a sodium ion, a potassium ion; polyvalent metals such as an aluminum ion, a barium ion, a calcium ion, a copper ion, an iron ion, a magnesium ion, a manganese ion, a nickel ion, a tin ion, a titanium ion and a zinc ion; a hydrochloric acid, a hydrobromic acid, a hydriodic acid, a sulfuric acid, a nitric acid, a phosphoric acid, a thiocyanic acid; organic carboxilic acid such as an acetic acid, an oxalic acid, an lactic acid, a fumaric acid, a citric acid, a salicylic acid and a benzoic acid; and an organic sulfonic acid.

Specific examples of these include alkali metal salts such as a lithium chloride, a sodium chloride, a potassium chloride, a sodium bromide, a potassium bromide, a sodium iodide, a potassium iodide, a sodium sulfate, a potassium nitrate, a sodium acetate, a potassium oxalate, a sodium citrate and a potassium benzoate; salts of polyvalent metal such as an aluminum chloride, an aluminum bromide, an aluminum sulfate, an aluminum nitrate, an aluminum sodium sulfate, an aluminum potassium sulfate, an aluminum acetate, a barium chloride, a barium bromide, a barium iodide, a barium oxide, a barium nitrate, a barium thiocyanate, a calcium chloride, a calcium bromide, a calcium iodide, a calcium nitrite, a calcium nitrate, a calcium dihydrogen phosphate, a calcium thiocyanate, a calcium benzoate, a calcium acetate, a calcium salicylate, a calcium tartarate, a calcium lactate, a calcium fumarate, a calcium citrate, a copper chloride, a copper bromide, a copper sulfate, a copper nitrate, a copper acetate, an iron chloride, an iron bromide, an iron iodide, an iron sulfate, an iron nitrate, an iron oxalate, an iron lactate, an iron fumarate, an iron citrate, a magnesium chloride, a magnesium bromide, a magnesium iodide, a magnesium sulfate, a magnesium nitrate, a magnesium acetate, a magnesium lactate, a manganese chloride, a manganese sulfate, a manganese nitrate, a manganese dihydrogen phosphate, a manganese acetate, a manganese salicylate, a manganese benzoate, a manganese lactate, a nickel chloride, a nickel bromide, a nickel sulfate, a nickel nitrate, a nickel acetate, a tin sulfate, a titanium chloride, a zinc chloride, a zinc bromide, a zinc sulfate, a zinc nitrate, a zinc thiocyanate and a zinc acetate.

Examples of organic amine compound include primary, secondary, tertiary and quaternary amines and salts thereof.

Examples include a tetraalkylammonium salt, an alkylamine salt, a benzalkonium salt, an alkylpyridium salt, an imidazolium salt, and a polyamine; e.g. an isopropylamine, an isobutylamine, a t-butylamine, a 2-ethylhexylamine, a nonylamine, a dipropylamine, a diethylamine, a trimethylamine, a triethylamine, a dimethylpropylamine, an ethylenediamine, a propylenediamine, a hexamethylenediamine, a diethylenetriamine, a tetraethylenepentamine, a diethanolamine, a diethylethanolamine, a triethanolamine, a tetramethylammonium chloride, a tetraethylammonium bromide, a dihydroxyethylstearylamine, a 2-heptadecenyl-hydroxyethylimidazoline, a lauryldimethylbenzylammonium chloride, a cetylpyridinium chloride, a stearamidomethylpyridinium chloride, a diallyldimethylammonium chloride polymer, a diallylamine polymer and a monoallylamine polymer; onium salts thereof such as sulfonium salt and phosphonium salt; and phosphoric acid esters thereof.

The organic acid is preferably a compound represented by the following formula (1).

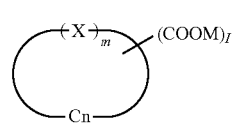

formula (1)

In the formula (1), X represents O, CO, NH, NR, S or $SO_2$, preferably CO, NH, NR or O, more preferably CO, NH or O;

R represents an alkyl group, preferably $CH_3$, $C_2H_5$ or $C_2H_4OH$; M represents a hydrogen atom, an alkali metal or an amine, preferably H, Li, Na, K, a monoethanolamine, a diethanolamine or a triethanolamine, more preferably H, Na or K, and further preferably a hydrogen atom;

n is an integer of 3 to 7, preferably the case where a heterocyclic ring is six- or five-membered, more preferably five-membered; m is 1 or 2.

The compound represented by the formula (1) may be either a saturated ring or an unsaturated ring as long as the compound is a heterocyclic ring; l is an integer of 1 to 5.

The compound represented by the formula (1) specifically indicates a compound having a furan, pyrrole, pyrroline, pyrrolidone, pyrrone, pyrrole, thiphene, indole, pyridine or quinoline structure, and further having a carboxyl group as a functional group.

Specific examples thereof include a 2-pyrrolidone-5-carboxylic acid, a 4-methyl-4-pentanolide-3-carboxylic acid, a furancarboxylic acid, a 2-bnzofurancarboxylic acid, a 5-methyl-2-furancarboxylic acid, a 2,5-dimethyl-3-furancarboxylic acid, a 2,5-furandicarboxylic acid, a 4-butanolide-3-carboxylic acid, a 3-hydroxy-4-pyrrone-2,6-dicarboxylic acid, a 2-pyrrone-6-carboxylic acid, a 4-pyrrone-2-carboxylic acid, a 5-hydroxy-4-pyrrone-5-carboxylic acid, a 4-pyrrone-2,6-dicarboxylic acid, a 3-hydroxy-4-pyrrone-2,6-dicarboxylic acid, a thiophenecarboxylic acid, a 2-pyrrolecarboxylic acid, a 2,3-dimethylpyrrole-4-carboxylic acid, a 2,4,5-trimethylpyrrole-3-propionic acid, a 3-hydroxy-2-indolecarboxylic acid, a 2,5-dioxo-4-methyl-3-pyrroline-3-propionic acid, a 2-pyrrolidinecarboxylic acid, a 4-hydroxyproline, a 1-methylpyrolidine-2-carboxylic acid, a 5-carboxy-1-methylpyrolidine-2-acetic acid, a 2-pyridinecarboxylic acid, a 3-pyridinecarboxylic acid, a 4-pyridinecarboxylic acid, a pyridinedicarboxylic acid, a pyridinetricarboxylic acid, a pyridinepentacarboxylic acid, a 1,2,5,6-tetrahydro-1-methylnicotinic acid, a 2-quinolinecarboxylic acid, a 4-quinolinecarboxylic acid, a 2-phenyl-4-quinolinecarboxylic acid, a 4-hydroxy-2-quinolinecarboxylic acid, a 6-methoxy-4-quinolinecarboxylic acid, and a derivative or a salt thereof.

The compound represented by the formula (1) is preferably a pyrrolidonecarboxylic acid, a pyrronecarboxylic acid, a pyrrolecarboxylic acid, a furancarboxylic acid, a pyridinecarboxylic acid, a coumalic acid, a thiphenecarboxylic acid, a nicotinic acid, or a derivative or a salt thereof; and more preferably a pyrrolidonecarboxylic acid, a pyrronecarboxylic acid, a furancarboxylic acid, a coumalic acid, and a derivative or a salt thereof.

Examples of the above-mentioned compounds are preferably a magnesium chloride, a magnesium bromide, a magnesium iodide, a magnesium sulfate, a magnesium nitrate, a magnesium acetate, a calcium chloride, a calcium bromide, a calcium nitrate, a calcium dihydrogen phosphate, a calcium benzoate, a calcium acetate, a calcium tartarate, a calcium lactate, a calcium fumarate, a calcium citrate, a diallyldimethylammonium chloride polymer, a diallylamine polymer, a monoallylamine polymer, a pyrrolidonecarboxylic acid, a pyrronecarboxylic acid, a pyrrolecarboxylic acid, a furancarboxylic acid, a pyridinecarboxylic acid, a coumalic acid, a thiophenecarboxylic acid, a nicotinic acid, a potassium dihydrogen citrate, a succinic acid, a tartaric acid, a lactic acid, a potassium hydrogen phthalate, and a derivative or a salt thereof; more preferably a magnesium chloride, magnesium nitrate, calcium nitrate, a diallylamine polymer, a pyrrolidonecarboxylic acid, a pyrronecarboxylic acid, a furancarboxylic acid, a coumalic acid, and a derivative or a salt thereof.

In the present invention, aggregating agents may be used alone or in combination of two or more.

The amount of the aggregating agent to be added in a processing solution is preferably 0.01 to 30% by mass, more preferably 0.1 to 15% by mass, further preferably 0.25 to 10% by mass, relative to the total mass of a processing solution.

In a case where the amount of the aggregating agent in a processing solution is less than 0.01% by mass, a coloring agent may not sufficiently aggregate when the processing solution is contacted with an ink, degrading the optical density and exacerbating the bleeding and intercolor bleeding. On the other hand, in a case where the amount of the aggregating agent is more than 30% by mass, ejection property may be lowered and a processing solution may not be properly ejected.

—Water-Soluble Organic Solvent—

The same kind of water-soluble solvent as the one used in the ink may be used for the processing solution.

The content of the water-soluble solvent is used within the range of 1 to 60% by mass, preferably 5 to 40% by mass, relative to the total mass of a processing solvent. In a case where the amount of the water-soluble solvent in the processing solution is less than 1% by mass, the optical density may not sufficiently be obtained. Conversely, in a case where the amount of the water-soluble solvent is more than 60% by mass, the viscosity of the processing solution may be increased, and the ejection property of the processing solution may be destabilized —Water—

Water may be added to a processing solution within the range that the above-mentioned surface tension and viscosity of the solution is obtained. The amount of water to be added is not particularly limited, but preferably 10 to 99% by mass, more preferably 30 to 80% by mass, relative to the total mass of a processing solution.

—Other Additives—

A colorant may also be included in the processing solution, if desired. The same kind of colorant as the one used in the ink may be used for the processing solution. Preferable examples of the colorant include a dye, a pigment having a sulfonic acid or a sulfonate salt on its surface, an anionic self-dispersible pigment or a cationic self-dispersible pigment. Such a colorant, being hard to aggregate in an acidic region, is considered to be effective to improve the storage stability of the processing solution.

It is also possible to improve the image quality such as optical density or blurring, by using the ink set comprising the above-mentioned ink and a processing solution containing at least an aggregating agent. This may be attributed to the aggregation of the colorant in the ink caused by mixing the ink and the processing solution on a recording medium. In other words, it is surmised that the density of the colorant on the recording medium is heightened, making it possible to increase the optical density so that the colorant does not disperse together with the ink, thus the blurring is mitigated.

The same kind of surfactant as the one used in the ink may be used for the processing solution. The amount of the surfactant is preferably less than 10% by mass, more preferably 0.01 to 5% by mass, and further preferably 0.01 to 3% by mass, relative to the total amount of the ink. In a case where the amount of the surfactant is more than 10%, the optical density and the storage stability of the processing solution may be deteriorated.

Other additives, e.g. a polyethyleneimine, a polyamine, a polyvinylpyrrolidone, a polyethylene glycol, a cellulose derivative such as an ethylcellulose and a carboxymethylcellulose, a polysaccharide and a derivative thereof; an emulsion of a polymer such as a water-soluble polymer, an acryl-based polymer, a polyurethane-based polymer and a hydrophilic latex; a hydrophilic polymer gel, a cyclodextrin, a macrocyclic amine, a dendrimer, crown ethers, a urea and a derivative thereof, an acetamide, a silicone-based surfactant, a fluorine-based surfactant, a water, a compound of an alkali metal such as a potassium hydroxide, a sodium hydroxide and a lithium hydroxide; a nitrogen-containing compound such as an ammonium hydroxide, a triethanolamine, a diethanolamine, an ethanolamine and a 2-amino-2-methyl-1-propanol; compounds of alkaline earth metals such as a calcium hydroxide; an acid such as a sulfuric acid, a hydrochloric acid and a nitric acid; a salt of a strong acid and a weak alkali such as an ammonium sulfate, may also be used.

—Preferable Property of the Processing Solution—

The surface tension of a processing solution is preferably 10 to 45 mN/m, more preferably 15 to 39 mN/m, and further preferably 15 to 35 mN/m. In a case where the surface tension of the processing solution is less than 10 mN/m, the solution may overflow to the surface of a head nozzle, and the ejection property of the solution may be deteriorated. On the other hand, in a case where the surface tension of the processing solution is more than 45 mN/m, permeation of the processing solution into a recording paper may be slowed and it may take a longer time to be dried.

The surface tension of the processing solvent is preferably smaller than the surface tension of ink. In a case where the speed of the processing solution to spread over a recording medium is faster than the speed of the processing solution to spread over a recording medium, the feathering may further be restrained.

The viscosity of the processing solution is preferably 1.2 to 15 mPa·s, more preferably 1.5 to 10 mPa·s and further preferably 1.8 to 8 mPa·s. In a case where the viscosity of the processing solution is more than 15 mPa·s, ejection property of the ink may be deteriorated. On the other hand, in a case where the viscosity of the processing solution is less than 1.2 mPa·s, ejection stability of the processing solution when continuously ejected may be deteriorated.

The viscosity and the surface tension of the processing solution are preferably adjusted to the range so that the spreading of a dot of the processing solvent is greater than that of the ink, when the amount per a drop of both is the same. In a case where the spreading of a dot is greater in the case of the processing solution, feathering may further be effectively restrained.

The pH value of the processing solution containing the compound represented by the formula (1) is preferably 1.5 to 12.0, more preferably 2.0 to 7.5 and further preferably 2.5 to 6.0. In a case where the pH value of the processing solution is less than 1.5, the ink-pathway part of a printing head is dissolved to cause disorder. On the other hand, in some cases where the pH value of the processing solution is more than 12.0, colorant does not sufficiently aggregate when the processing solution is contacted with the ink, degrading the optical density, bleeding and intercolor bleeding.

The number of a coarse particle having a size of 5 µm or larger in a mixture of the ink and the processing solution is preferably more than 500/µL, more preferably 500 to 10,000/µL and further preferably 500 to 3,000/µL. In a case where the number of a coarse particle having a size of 5 µm or larger contained in a mixture of ink and processing solution is less than 500/µL, the optical density may be reduced.

In the present invention, the number of the coarse particle having a size of 5 µm or larger in a mixture of the ink and the processing solvent was measured in accordance with the following process: mixing the two liquids at a ratio of 1:1 by mass; sampling a 2 µL of the mixture while stirring; and measuring the number of particle by Accusizer TM770 Optical Particle Sizer (manufactured by Particle Sizing Systems Inc.). As a parameter to be input, density of a colorant is used for the density of a dispersed particle. The density of a colorant can be calculated by measuring the colorant powder by a gravimeter or a pycnometer, the powder being obtained by heating and drying a solution in which the colorant is dispersed.

[Ink Cartridge]

The ink cartridge of the present invention comprises a container in which the above-mentioned recording ink of the present invention is contained, and optionally other members.

Any shape, structure, size, material or the like may be applied for the above-mentioned container without a particular limitation. For example, an ink cartridge comprising at least an ink bag of an aluminum laminated film, a resin film or the like, is preferably used.

An ink tank disclosed in JP-A 2001-138541, for example, can also be used for the above-mentioned container.

In this case, the ink or the processing solution constituting the ink set of the present invention are filled in the ink tank, so the properties of the ink contained in the ink tank can remain unchanged in the course of long-term storage, and the ejection property, especially when the ink is ejected from the recording head after long-term storage, can be maintained well enough to be satisfied.

[Inkjet Recording Method, Inkjet Recording Device]

In the recording method of the present invention, the above-mentioned ink is applied onto a recording medium by an inkjet method. In a case where a processing solvent is used, the liquid to be applied onto a recording medium by the inkjet method may either or both the ink and the processing solution, but more preferably both the ink and the processing solution are applied to the recording medium by the inkjet method.

The inkjet recording device of the present invention comprises a recording head which ejects the ink or the solution in the ink set of the present invention onto a recording medium. A recording device provided with a heater to control the drying of an ink, or a recording device provided with an intermediate-transfer mechanism in which a recording material is printed to the intermediate, then transferred to a recording medium such as a paper, or other ordinary ink jet recording devices may be used as a recording device of the present invention.

A thermal inkjet recording system and a piezo inkjet recording system are preferably applied to the inkjet recording method (device) of the present invention, from the viewpoint of restraining blurring and intercolor blurring.

In the thermal inkjet recording system, although the reason is not exactly clarified, blurring and intercolor blurring are effectively restrained since the viscosity of the ink rapidly increases as the temperature of the ejected ink on a recording medium decreases, from the low viscosity of the ink when heated to be ejected.

The piezo inkjet system can eject a liquid having a high viscosity, which can be restrained from the spreading over the recording paper, therefore it is thought that blurring and intercolor blurring are effectively restrained, although not exactly clarified.

The molar ratio between the amount of the ink and the processing solution to be applied to form one pixel is preferably 1:20 to 20:1, more preferably 1:10 to 10:1, and further preferably 1:5 to 5:1.

In a case where the amount of the ink to be applied is too small or too large compared to the amount of the processing solution to be applied, the aggregation may not be sufficient and the optical density may be lowered and blurring and intercolor blurring may be exacerbated.

The pixel is a lattice point formed by dividing a desired image in a scanning direction and a sub-scanning direction, the distance between each pixel is the minimum length where the ink can be applied. By applying a proper ink set to each pixel, the color and the image density is adjusted to form the desired image.

The inkjet ink and the processing solution are applied onto a recording medium such that they contact with each other, whereby the ink aggregates by the action of the aggregating agent. In this way, the recording method which excels in the color development, color evenness color in the painted area, optical, prevents density bleeding and intercolor bleeding, and shortens the drying time can be obtained. The ink and the processing solution may be put either adjacently or in layers, as long as they are in contact with each other.

The processing solution is applied onto the recording medium before the ink is applied. In this way, the component of the ink can effectively be aggregated. The timing to apply the ink is not particularly limited, only if it is after application of the processing solution, but preferably 0.5 second after the processing solution is applied.

In the inkjet recording method (device) of the present invention, it is preferable that both the inkjet ink and the processing solution have a mass-per-drop of 0.01 to 25 ng, more preferably 0.5 to 20 ng and further preferably 0.5 to 15 ng. In a case where the mass-per-drop is more than 25 ng, blurring may be exacerbated. It can be attributed to the change in the contact angle of the inkjet ink and the processing solution against the recording medium, which depends on the amount of a droplet. The larger the amount of the droplet is, the more easily the droplet spreads over the surface of the paper. In a case where a mass-per-drop is less than 0.01 ng, the ejection stability may be degraded.

In the case of an inkjet recording device which can eject ink in varying amounts per drop from the same nozzle, the above-mentioned mass-per-drop indicates the minimum amount of a droplet which is required for printing.

Preferable embodiments of the inkjet recording apparatus of the present invention will herein be described in detail in accordance with reference to the figures. In the figures, members having practically the same function are represented by the same numeral and the overlapping explanations are omitted in the following description.

Figure 2:
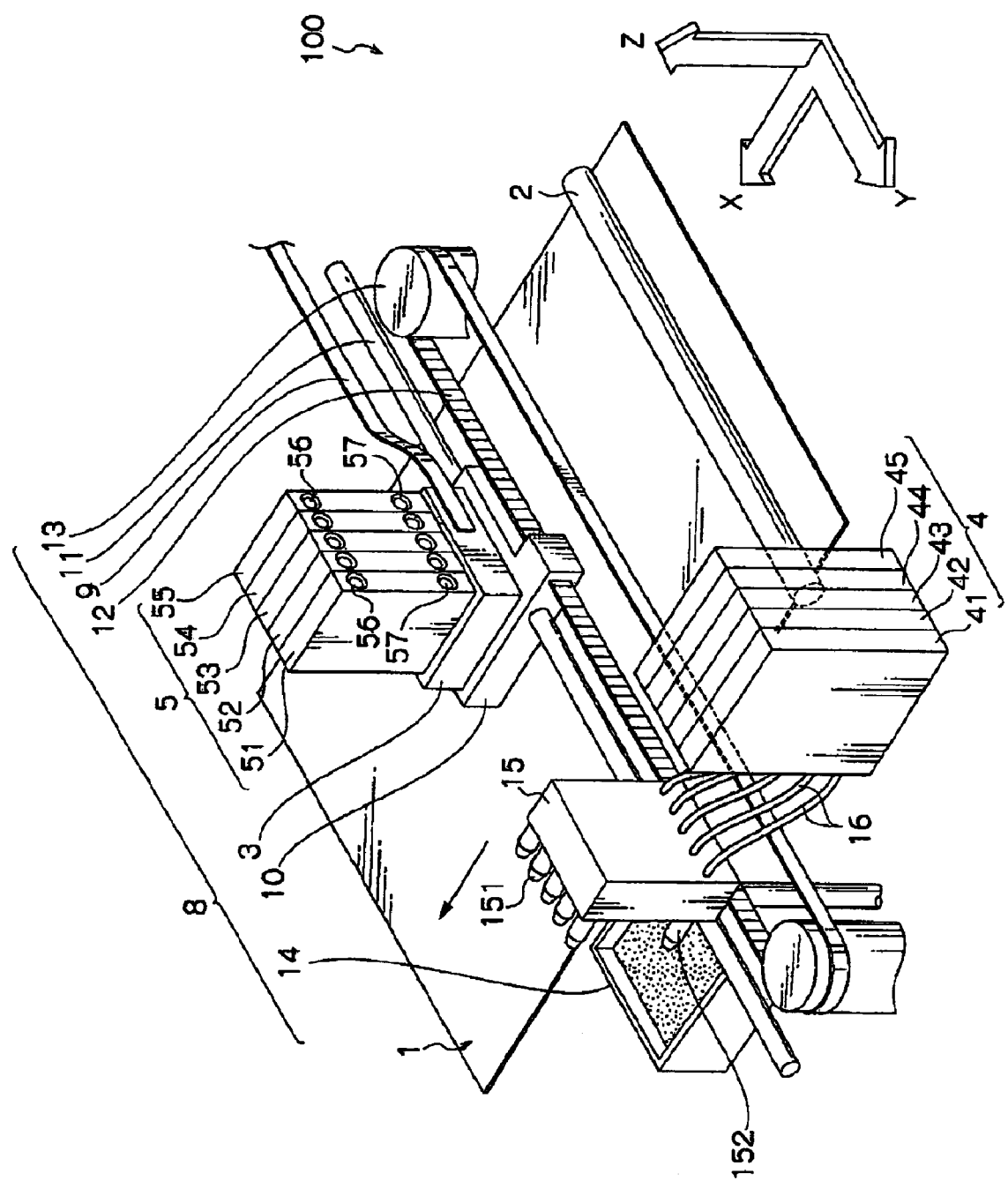
FIG. 2 is a perspective view showing the basic configuration inside the inkjet recording device of FIG. 1.

FIG. 1 is a perspective view illustrating the external constitution of a preferable embodiment of the inkjet recording apparatus of the invention. FIG. 2 is a perspective view illustrating the basic interior constitution of the inkjet recording apparatus (occasionally referred to as "image forming apparatus" hereinafter) of FIG. 1.

The image forming apparatus 100 of this embodiment forms an image by the inkjet recording method of the invention. As shown in FIGS. 1 and 2, the image forming apparatus 100 chiefly comprises an outer cover 6; a tray 7 in which a predetermined amount of recording medium 1, such as a paper, can be placed; a conveyance roller 2 to convey the recording medium 1 sheet by sheet to the inside of the image forming apparatus 100; an image forming section 8 which ejects ink and processing solution onto the surface of the recording medium 1 to form an image; and a main ink tank 4 which supplies the ink and the processing liquid to a sub ink tank 5.

The conveyance roller 2 is a device to convey the sheet of recording medium comprising a pair of rotating rollers disposed in the inside of the image forming apparatus 100. The recording medium 1 set on the tray 7 is pinched and conveyed into the inside of the image forming apparatus 100 sheet by sheet at a predetermined pace.

The image forming section 8 forms an image by the ink on the surface of the recording medium 1. The image forming section 8 chiefly comprises a recording head 3; a sub ink tank 5; a feeder signal cable 9; a carriage 10; a guide rod 11; a timing belt 12; a driving pulley 13; and a maintenance unit 14.

The sub ink tank 5 comprises sub ink tank units 51, 52, 53, 54 and 55, which respectively contain ink of different color or processing solution so as to be ejected from the recording head. In each sub ink tank unit 51 to 55, for example, a black ink (K), a yellow ink (Y), a magenta ink (M), a cyan ink (C) or a processing solution may be contained. When the processing solution is not used, or a colorant is included in the processing solution, there is of course no need for an ink tank for the processing solution.

Each sub ink tank unit 51 to 55 has an exhaust opening 56 and a replenishment opening 57. When the recording head 3 is at a stand-by position (or a replenishment position), an exhaust pin 151 and a replenishment pin 152 of a replenish device 15 are respectively inserted into the exhaust opening 56 and the replenishment opening 57, so that the sub ink tank 5 and the replenishment device 15 are connected with each other. The replenishment device 15 is connected to the main tank 4 via replenishment tubes 16. The ink replenishment device 15 sends ink and processing solution from the main ink tank 4, through the replenishment openings 57, to replenish the sub ink tank 5.

The main ink tank 4 comprises main ink tank units 41, 42, 43, 44 and 45 each containing ink of different color or processing solution. For example, each main ink tank unit 41 to 45 may contain a black ink (K), a yellow ink (Y), a magenta ink (M), a cyan ink (C) or a processing solution, and each unit is stored in the image forming apparatus 100 in such a manner that the units can be detached.

The feeder signal cable 9 and the sub ink tank 5 are connected to the recording head 3. When an exterior image recording information is transmitted to the recording head 3 via the feeder signal cable 9, the recording head 3 suctions the predetermined amounts of ink and processing solution from the sub ink tank units 51 to 55 and ejects them onto the surface of the recording medium 1, in accordance with the image-recording information. The feeder signal cable 9 not only transmits the image-recording information, but also powers the recording head 3 to drive the recording head 3.

The recording head 3 is disposed on the carriage 10. The carriage 10 is connected to the guide rod 11 and the timing belt 12 which is connected to the driving pulley 13. In this structure, the recording head 3 can move in the direction of main-scanning direction Y, which is parallel to the surface of the recording medium 1 and perpendicular to the direction of sub-scanning direction X, along with the guide rod 11.

The image forming apparatus 100 further comprises a control element (not shown) which controls the timing to drive the recording head 3 and the timing to drive the carriage 10 in accordance with the image-recording information. In this structure, the image can continuously be formed in the specified area on the surface of the recording medium 1 which is conveyed at a predetermined velocity in the direction X, in accordance with the image-recording information, The maintenance unit 14 is connected to a decompressor (not shown) via a tube. The maintenance unit 14 is also connected to a nozzle part of the recording head 3 and suctions ink from the nozzles of the recording head 3 by reducing the pressure inside the nozzles. By providing the maintenance unit 14, the unnecessary ink attached to the nozzles may be removed while the image forming device 100 is in operation, or the ink may be prevented from evaporating through the nozzles when the image forming device 100 is not in operation, if necessary.

Figure 3:
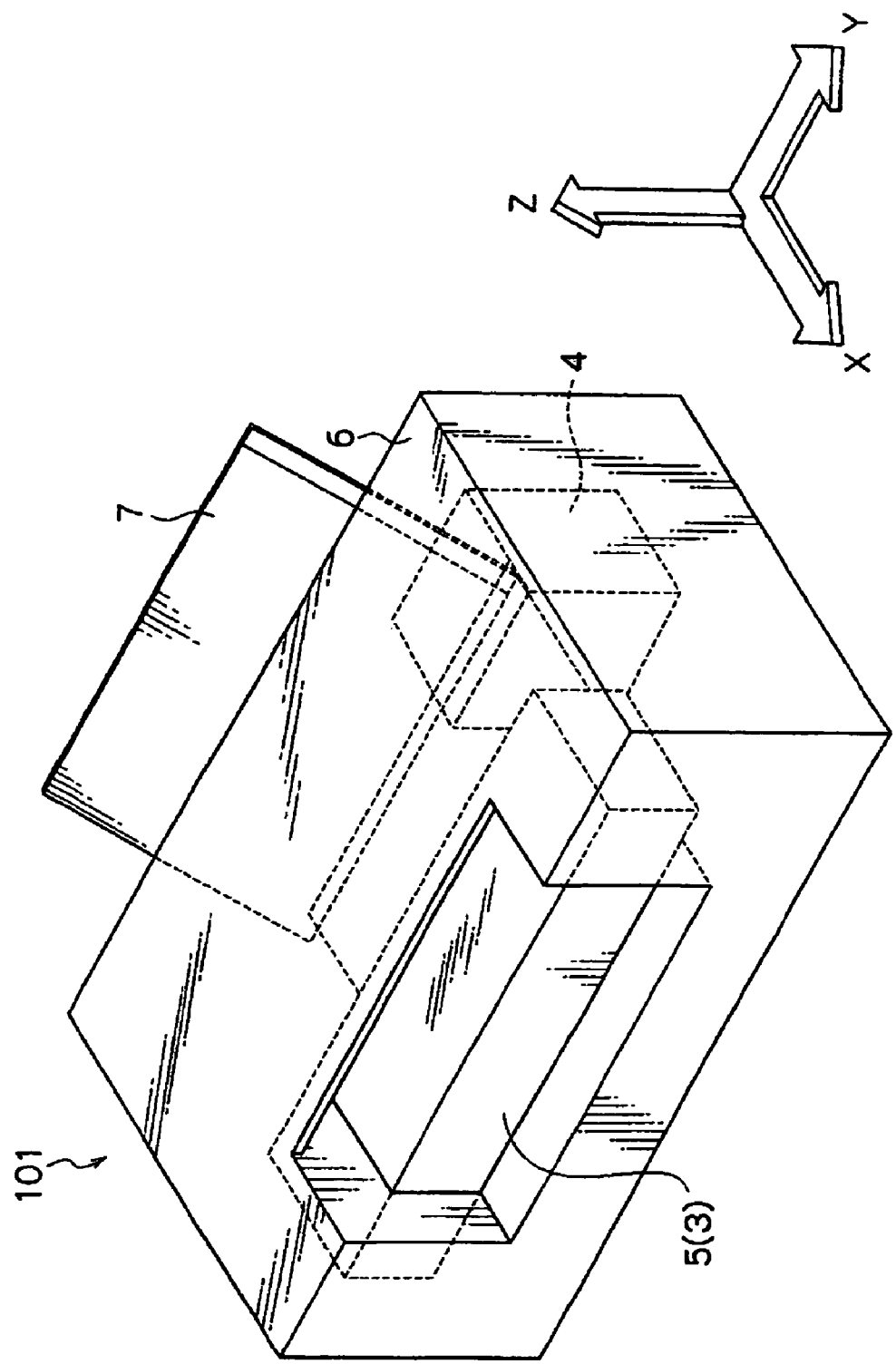
FIG. 3 is a perspective view showing an external configuration of another preferable embodiment of an inkjet recording device of the present invention.
Figure 4:
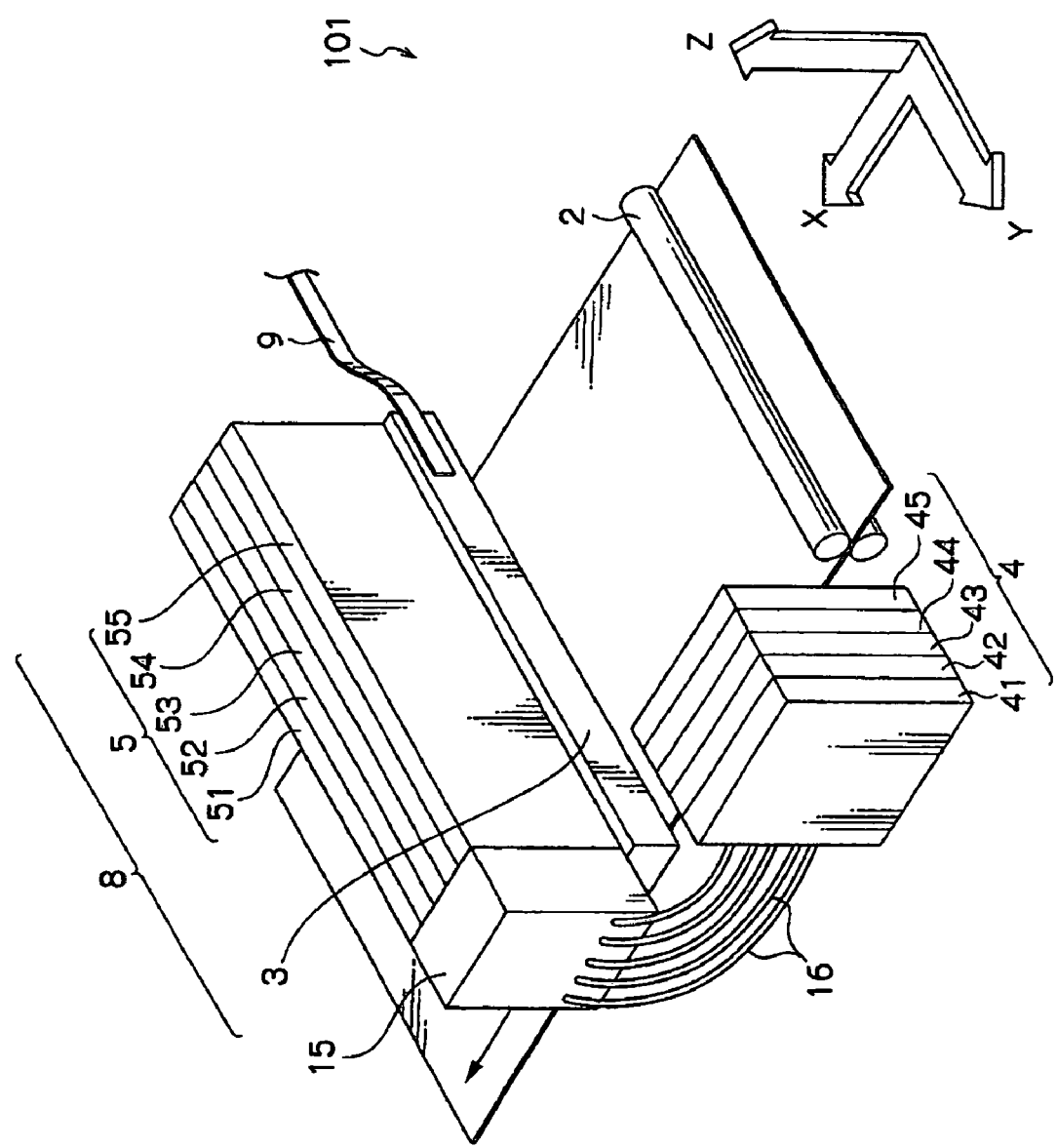
FIG. 4 is a perspective view showing the basic configuration inside the inkjet recording device of FIG. 3.

FIG. 3 is a perspective view illustrating the external constitution of another preferable embodiment of the inkjet recording apparatus of the present invention. FIG. 4 is a perspective view illustrating the basic interior constitution of the inkjet recording apparatus (occasionally referred to as "image forming apparatus" hereinafter) of FIG. 3. The image forming apparatus 101 in this embodiment has the structure wherein an image is formed in accordance with the inkjet recording method of the present invention.

In the image forming apparatus 101 shown in FIGS. 3 and 4, the width of the recording head 3 is equal to or larger than the width of the recording medium 1, no carriage structure is provided, and the sheet conveyance system is designed to be in the direction of sub-scanning direction X (the direction wherein the recording medium 1 is conveyed). The sheet conveyance system of this embodiment is described as the transportation rollers 2, but other structures such as a belt-type structure are also applicable.

The nozzles (now shown) to eject the inks of each color and the processing liquid are also aligned in the direction of sub-scanning direction X (the direction wherein the recording medium 1 is conveyed), as with the sub ink tank units 51 to 55 aligned in the sub scanning direction. Other structures shown in FIGS. 3 and 4, which are the same as the structures shown in the image forming apparatus 100 in FIGS. 1 and 2, are not particularly described herein.

Although the sub ink tank 5 is designed to constantly connect to the replenishment device 15 since the recording head 3 is designed to be fixed in the FIGS. 3 and 4, the sub ink tank 5 may also be connected to the replenishment device 15 only at the time of replenishment of the ink or processing liquid.

In the image forming apparatus 101 shown in FIGS. 3 and 4, the printing process in the direction of the width of the recording medium 1 (the main scanning direction) is collectively carried out by the recording head 3. Therefore, the apparatus 101 is simpler in the structure and higher in the printing speed compared to the apparatus having a carriage system.

The ink, ink set, ink cartridge, recording method and recording device according to the invention are applicable for not only a medium having a permeation characteristics such as a plain paper, but also an art paper, a film or a medium having no permeation characteristics such as a metal to be formed an image thereon. Therefore, the present invention is applicable for the fields such as a printing, manufacturing of an electric wiring substrate, manufacturing of a display device such as a color filter, a liquid crystal display or an organic EL display, medical film recording, DNA information recording and a building material such as a wall paper and a decorative paper.

The best mode of the ink of the present invention is the inkjet recording method, but also applicable for an offset printing, a gravure printing, a flexo printing, a screen printing or the like.

The illustrative embodiments of the present invention will be described in the following:

1. An ink containing at least a pigment, water, a water-soluble organic solvent, a lithium ion and one or more of cation other than the lithium ion.
2. The ink according to 1, wherein the cation other than the lithium ion is an alkali metal ion or an organic cation.
3. The ink according to 2, wherein the alkali metal ion is a sodium ion or a potassium ion.
4. The ink according to 2, wherein the organic cation is a monovalent cation.
5. The ink according to 2, wherein the organic cation is at least one selected from the group consisting of a tetramethyl ammonium hydroxide and an alkanol amine.
6. The ink according to any one of 1 to 5, wherein the molar ratio between the content of the lithium ion and the other cation is approximately 1:50 to approximately 15:1.
7. The ink according to any one of 1 to 6, wherein the content of the lithium ion relative to the content of the pigment is approximately 0.001 to approximately 5% by mass.
8. The ink according to any one of 1 to 7, wherein the content of the pigment relative to the total amount of the ink is approximately 1 to approximately 25% by mass.
9. The ink according to any one of 1 to 8, wherein the content of the water relative to the total amount of the ink is approximately 30 to approximately 80% by mass.
10. The ink according to any one of 1 to 9, wherein the surface tension is approximately 20 to approximately 40 mN/m.
11. The ink according to any one of 1 to 10, further containing a polymer having a weight average molecular weight of approximately 3,000 to approximately 50,000, an acidic value of approximately 50 to approximately 400, and a neutralization degree of approximately 20 to approximately 100%.
12. The ink according to any one of 1 to 11, wherein the SP value of the water-soluble organic solvent when only one water-soluble organic solvent is included, or the SP value of a mixture of water-soluble organic solvents when a plurality of water-soluble organic solvents are included, is approximately 13 to approximately 25.
13. The ink according to any one of 1 to 12, wherein the pigment is at least one selected from the group consisting of a self dispersible pigment, a pigment dispersed using a polymer dispersant, and a colored fine particles dispersed with a colored resin.
14. An ink set including at least the ink according to any one of 1 to 13.
15. The ink set according to 14, wherein a processing solution containing an aggregating agent is included.
16. The ink set according to 15, wherein the aggregating agent is at least one selected from the group consisting of an organic acid, an inorganic electrolyte and an organic amine compound.
17. A recording method wherein the ink according to any one of 1 to 13 is applied onto a recording medium by an inkjet method.
18. A recording method wherein at least one liquid selected from the ink and the processing solution of the ink set according to any one of 14 to 16 is applied onto a recording medium by an inkjet method.
19. A recording method using the ink set according to 15 or 16, wherein the ink and the processing solution are applied so as to contact with each other to form a pattern or an image onto a recording medium.
20. The recording method according to 18 or 19, wherein the mass ratio between the amount of the ink and the processing solution to be applied onto a recording medium to form a pixel is in a range of approximately 1:20 to approximately 20:1.
21. An ink cartridge comprising the ink according to any one of 1 to 13 or the ink set according to any one of 14 to 16.
22. A recording device comprising an ink ejector to eject the ink according to any one of 1 to 13.
23. A recording device comprising an ink ejector to eject the ink and the processing solution of the ink set according to any one of 14 to 16.
24. The recording device according to 22 or 23, wherein the ink ejector is in the form of the inkjet method.
25. The recording device according to 24, wherein the amount of the ink to be applied onto a recording medium is approximately 0.01 to approximately 25 ng per drop.
26. The recording device according to 24 or 25, wherein the mass ratio between the amount of the ink and the processing solution to be applied onto a recording medium to form a pixel is in a range of approximately 1:20 to approximately 20:1.

EXAMPLES

The present invention will further be explained with reference to, but not limited to, the following specific examples.

Example 1

<Ink Preparation>

| | |
|---|---|
| Self-dispersible pigment | 12% by mass |
| Glycerine | 20% by mass |
| Ethylene glycol | 10% by mass |
| Diethylene glycol monobutyl ether | 4% by mass |
| Surfactant (SFN465) | 1% by mass |
| $LiOH.H_2O$ | 0.02% by mass |
| NaOH | 0.11% by mass |
| Water | balance |

Details of the materials used will be described later (hereinafter, the same is applied to Examples 2 to 20 and Comparative Examples 1 to 4.).

The desired ink is obtained by filtrating a liquid obtained by mixing and agitating the above-mentioned composition using a 5 μm filter.

The ink has viscosity of 4.2 mPa·s; surface tension of 31 mN/m; pH value of 8.8; SP value of 18.2 of a solvent; molar ratio of 1:5.8 between lithium ion and the other cation(s); and 0.028% by mass of a content of lithium ion relative to a content of the pigment [lithium ion (mass)/pigment (mass)].

Example 2

<Ink Preparation>

| | |
|---|---|
| Pigment | 7.8% by mass |
| Styrene-acrylic acid copolymer | 1.8% by mass |
| (weight average molecular weight: 4,500, acidic value: 110, neutralization degree: 60) | |
| Diethylene glycol | 10% by mass |
| 1,2-hexane diol | 10% by mass |
| Surfactant (POE-2EH) | 1% by mass |
| LiOH.H$_2$O | 0.04% by mass |
| Triethanol amine | 0.015% by mass |
| NaOH | 0.085% by mass |
| Water | balance |

The desired ink is obtained by filtrating a liquid obtained by mixing and agitating the above-mentioned composition using a 5 μm filter. The ink has viscosity of 5.1 mPa·s; surface tension of 33 mN/m; pH value of 7.4; SP value of 14.2 of a solvent; molar ratio of 1:2.3 between lithium ion and the other cation(s); and 0.085% by mass of a content of lithium ion relative to a content of the pigment [lithium ion (mass)/pigment (mass)].

Example 3

<Ink Preparation>

| | |
|---|---|
| Pigment | 7.8% by mass |
| Styrene-acrylic acid copolymer | 1.8% by mass |
| (weight average molecular weight: 4,500, acidic value: 110, neutralization degree: 35) | |
| Glycerine | 20% by mass |
| Ethylene glycol | 10% by mass |
| Diethylene glycol monobutyl ether | 4% by mass |
| Surfactant (SFN465) | 1% by mass |
| LiOH.H$_2$O | 0.03% by mass |
| Triethanol amine | 0.015% by mass |
| NaOH | 0.049% by mass |
| Water | balance |

The desired ink is obtained by filtrating a liquid obtained by mixing and agitating the above-mentioned composition using a 5 μm filter. The ink has viscosity of 5.8 mPa·s; surface tension of 32 mN/m; pH value of 7.3; SP value of 18.2 of a solvent; molar ratio of 1:1.9 between lithium ion and the other cation(s); and 0.064% by mass of a content of lithium ion relative to a content of the pigment [lithium ion (mass)/pigment (mass)].

Example 4

<Ink Preparation>

| | |
|---|---|
| Pigment | 4% by mass |
| Styrene-methyl acrylate copolymer | 1% by mass |
| (weight average molecular weight: 43,000, acidic value: 220, neutralization degree: 95) | |
| Glycerine | 28% by mass |
| Propylene glycol | 5% by mass |
| Surfactant (SFN465) | 1.5% by mass |
| LiOH.H$_2$O | 0.006% by mass |
| Tetramethyl ammonium hydroxide | 0.01% by mass |
| NaOH | 0.149% by mass |
| Water | balance |

The desired ink is obtained by filtrating a liquid obtained by mixing and agitating the above-mentioned composition using a 5 μm filter. The ink has viscosity of 4.2 mPa·s; surface tension of 31 mN/m; pH value of 8.2; SP value of 19.4 of a solvent; molar ratio of 1:26.8 between lithium ion and the other cation(s); and 0.0248% by mass of a content of lithium ion relative to a content of the pigment [lithium ion (mass)/pigment (mass)].

Example 5

<Ink Preparation>

| | |
|---|---|
| Pigment | 24% by mass |
| Styrene-methyl acrylate copolymer | 6% by mass |
| (weight average molecular weight: 3,800, acidic value: 55, neutralization degree: 85) | |
| Glycerine | 20% by mass |
| Diethylene glycol | 15% by mass |
| Surfactant (SFN465) | 1.5% by mass |
| LiOH.H$_2$O | 0.0075% by mass |
| Tetramethyl ammonium hydroxide | 0.25% by mass |
| NaOH | 0.2% by mass |
| Water | balance |

The desired ink is obtained by filtrating a liquid obtained by mixing and agitating the above-mentioned composition using a 5 μm filter. The ink has viscosity of 25 mPa·s; surface tension of 35 mN/m; pH value of 7.2; SP value of 17.9 of a solvent; molar ratio of 1:43.3 between lithium ion and the other cation(s); and 0.0052% by mass of a content of lithium ion relative to a content of the pigment [lithium ion (mass)/pigment (mass)].

Example 6

<Ink Preparation>

| | |
|---|---|
| Pigment | 5% by mass |
| N-butyl methacrylate-methyl acrylate copolymer | 1.2% by mass |
| (weight average molecular weight: 6,000, acidic value: 370, neutralization degree: 25) | |
| Glycerine | 20% by mass |
| Propylene glycol | 5% by mass |
| Diethylene glycol monobutyl ether | 4% by mass |
| Surfactant (POE lauryl ether) | 1% by mass |

-continued

| | |
|---|---|
| LiOH.H$_2$O | 0.383% by mass |
| NaOH | 0.025% by mass |
| Water | balance |

The desired ink is obtained by filtrating a liquid obtained by mixing and agitating the above-mentioned composition using a 5 μm filter. The ink has viscosity of 4.2 mPa·s; surface tension of 30 mN/m; pH value of 8.1; SP value of 18.0 of a solvent; molar ratio of 14.6:1 between lithium ion and the other cation(s); and 1.27% by mass of a content of lithium ion relative to a content of the pigment [lithium ion (mass)/pigment (mass)].

Example 7

<Ink Preparation>

| | |
|---|---|
| Styrene-methacrylic acid copolymer (weight average molecular weight: 25,000, acidic value: 120, neutralization degree: 75) | 10% by mass 2% by mass |
| Glycerine | 25% by mass |
| Surfactant (SFN465) | 1% by mass |
| LiOH.H$_2$O | 0.16% by mass |
| NaOH | 0.015% by mass |
| Water | balance |

The desired ink is obtained by filtrating a liquid obtained by mixing and agitating the above-mentioned composition using a 5 μm filter. The ink has viscosity of 7.3 mPa·s; surface tension of 33 mN/m; pH value of 7.5; SP value of 20 of a solvent; molar ratio of 10.1:1 between lithium ion and the other cation(s); and 0.26% by mass of a content of lithium ion relative to a content of the pigment [lithium ion (mass)/pigment (mass)].

Example 8

<Ink Preparation>

| | |
|---|---|
| Pigment | 8.5% by mass |
| Styrene-methyl acrylate copolymer (weight average molecular weight: 33,000, acidic value: 180, neutralization degree: 85) | 1.8% by mass |
| Glycerine | 5% by mass |
| Diglycerine ethylene oxide adduct | 15% by mass |
| Surfactant (POE-2EH) | 1.2% by mass |
| LiOH.H$_2$O | 0.216% by mass |
| NaOH | 0.025% by mass |
| Water | balance |

The desired ink is obtained by filtrating a liquid obtained by mixing and agitating the above-mentioned composition using a 5 μm filter. The ink has viscosity of 6.1 mPa·s; surface tension of 31 mN/m; pH value of 7.8; SP value of 13.7 of a solvent; molar ratio of 8.2:1 between lithium ion and the other cation(s); and 0.42% by mass of a content of lithium ion relative to a content of the pigment [lithium ion (mass)/pigment (mass)].

Example 9

<Ink Preparation>

| | |
|---|---|
| Self-dispersible pigment | 5% by mass |
| Glycerine | 20% by mass |
| Ethylene glycol | 10% by mass |
| Diethylene glycol monobutyl ether | 4% by mass |
| Surfactant (SFN465) | 1% by mass |
| LiOH.H$_2$O | 0.06% by mass |
| NaOH | 0.05% by mass |
| Water | balance |

The desired ink is obtained by filtrating a liquid obtained by mixing and agitating the above-mentioned composition using a 5 μm filter. The ink has viscosity of 4.2 mPa·s; surface tension of 31 mN/m; pH value of 8.8; SP value of 18.2 of a solvent; molar ratio of 1.1:1 between lithium ion and the other cation(s); and 0.198% by mass of a content of lithium ion relative to a content of the pigment [lithium ion (mass)/pigment (mass)].

Example 10

<Ink Preparation>

| | |
|---|---|
| Pigment | 5% by mass |
| Styrene-acrylic acid copolymer (weight average molecular weight: 4,500, acidic value: 110, neutralization degree: 60) | 1% by mass |
| Glycerine | 20% by mass |
| Diethylene glycol | 10% by mass |
| 1,2-hexane diol | 10% by mass |
| Surfactant (SFN465) | 1% by mass |
| LiOH.H$_2$O | 0.1% by mass |
| NaOH | 0.067% by mass |
| Water | balance |

The desired ink is obtained by filtrating a liquid obtained by mixing and agitating the above-mentioned composition using a 5 μm filter. The ink has viscosity of 4.8 mPa·s; surface tension of 33 mN/m; pH value of 7.4; SP value of 17.1 of a solvent; molar ratio of 1.4:1 between lithium ion and the other cation(s); and 0.331% by mass of a content of lithium ion relative to a content of the pigment [lithium ion (mass)/pigment (mass)].

Example 11

<Ink Preparation>

| | |
|---|---|
| Self-dispersible pigment | 5% by mass |
| Glycerine | 20% by mass |
| Ethylene glycol | 10% by mass |
| Diethylene glycol monobutyl ether | 4% by mass |
| Surfactant (SFN465) | 1% by mass |
| LiOH.H$_2$O | 0.1% by mass |
| Triethanol amine | 0.1% by mass |
| Water | balance |

The desired ink is obtained by filtrating a liquid obtained by mixing and agitating the above-mentioned composition using a 5 μm filter. The ink has viscosity of 4.4 mPa·s; surface tension of 31 mN/m; pH value of 8.6; SP value of 18.2 of a solvent; molar ratio of 3.6:1 between lithium ion and the other cation(s); and 0.331% by mass of a content of lithium ion relative to a content of the pigment [lithium ion (mass)/pigment (mass)].

Example 12

<Ink Preparation>

| | |
|---|---|
| Pigment | 5% by mass |
| Styrene-acrylic acid copolymer | 1% by mass |
| (weight average molecular weight: 4,500, acidic value: 110, neutralization degree: 60) | |
| Glycerine | 20% by mass |
| Diethylene glycol | 10% by mass |
| 1,2-hexane diol | 10% by mass |
| Surfactant (SFN465) | 1% by mass |
| LiOH.H$_2$O | 0.1% by mass |
| Diethanol amine | 0.1% by mass |
| Water | balance |

The desired ink is obtained by filtrating a liquid obtained by mixing and agitating the above-mentioned composition using a 5 μm filter. The ink has viscosity of 5.1 mPa·s; surface tension of 33 mN/m; pH value of 7.3; SP value of 17.1 of a solvent; molar ratio of 2.5:1 between lithium ion and the other cation(s); and 0.331% by mass of a content of lithium ion relative to a content of the pigment [lithium ion (mass)/pigment (mass)].

Example 13

<Ink Preparation>

| | |
|---|---|
| Self-dispersible pigment | 27.5% by mass |
| Glycerine | 2% by mass |
| Ethylene glycol | 5% by mass |
| Diethylene glycol monobutyl ether | 20% by mass |
| Surfactant (SF7N465) | 1% by mass |
| LiOH.H$_2$O | 0.5% by mass |
| NaOH | 0.03% by mass |
| Water | balance |

The desired ink is obtained by filtrating a liquid obtained by mixing and agitating the above-mentioned composition using a 5 μm filter. The ink has viscosity of 28 mPa·s; surface tension of 35 mN/m; pH value of 7.8; SP value of 12.6 of a solvent; molar ratio of 15.9:1 between lithium ion and the other cation(s); and 0.301% by mass of a content of lithium ion relative to a content of the pigment [lithium ion (mass)/pigment (mass)].

Example 14

<Ink Preparation>

| | |
|---|---|
| Pigment | 0.8% by mass |
| Styrene-acrylic acid copolymer | 0.2% by mass |
| (weight average molecular weight: 4,500, acidic value: 110, neutralization degree: 60) | |
| Diethylene glycol | 10% by mass |
| 1,2-hexane diol | 7.5% by mass |
| Surfactant (POE-2EH) | 1% by mass |
| LiOH.H$_2$O | 0.15% by mass |

-continued

| | |
|---|---|
| Triethanol amine | 0.015% by mass |
| NaOH | 0.009% by mass |
| Water | balance |

The desired ink is obtained by filtrating a liquid obtained by mixing and agitating the above-mentioned composition using a 5 μm filter. The ink has viscosity of 2.3 mPa·s; surface tension of 31 mN/m; pH value of 8.2; SP value of 14.3 of a solvent; molar ratio of 10.65:1 between lithium ion and the other cation(s); and 3.101% by mass of a content of lithium ion relative to a content of the pigment [lithium ion (mass)/pigment (mass)].

Example 15

<Ink Preparation>

| | |
|---|---|
| Pigment | 7.8% by mass |
| Styrene-acrylic acid copolymer | 1.8% by mass |
| (weight average molecular weight: 2,500, acidic value: 450, neutralization degree: 105) | |
| Glycerine | 20% by mass |
| Diethylene glycol monobutyl ether | 10% by mass |
| Surfactant (SFN465) | 1% by mass |
| LiOH.H$_2$O | 0.05% by mass |
| Triethanol amine | 0.01% by mass |
| NaOH | 0.606% by mass |
| Water | 0.606 balance |

The desired ink is obtained by filtrating a liquid obtained by mixing and agitating the above-mentioned composition using a 5 μm filter. The ink has viscosity of 5.6 mPa·s; surface tension of 32 mN/m; pH value of 7.9; SP value of 18.2 of a solvent; molar ratio of 1:12.8 between lithium ion and the other cation(s); and 0.106% by mass of a content of lithium ion relative to a content of the pigment [lithium ion (mass)/pigment (mass)].

Example 16

<Ink Preparation>

| | |
|---|---|
| Pigment | 4% by mass |
| Styrene-methyl acrylate copolymer | 1% by mass |
| (weight average molecular weight: 52,000, acidic value: 220, neutralization degree: 95) | |
| Glycerine | 28% by mass |
| Propylene glycol | 7% by mass |
| Surfactant (SFN465) | 1.5% by mass |
| LiOH.H$_2$O | 0.006% by mass |
| Tetramethyl ammonium hydroxide | 0.01% by mass |
| NaOH | 0.149% by mass |
| Water | balance |

The desired ink is obtained by filtrating a liquid obtained by mixing and agitating the above-mentioned composition using a 5 μm filter. The ink has viscosity of 10.2 mPa·s; surface tension of 31 mN/m; pH value of 7.5; SP value of 19.2 of a solvent; molar ratio of 1:26.8 between lithium ion and the other cation(s); and 0.025% by mass of a content of lithium ion relative to a content of the pigment [lithium ion (mass)/pigment (mass)].

Example 17

<Ink Preparation>

| | |
|---|---|
| Pigment | 4% by mass |
| Styrene-methyl acrylate copolymer | 1% by mass |
| (weight average molecular weight: 7,500, acidic value: 45, neutralization degree: 15) | |
| Glycerine | 28% by mass |
| Propylene glycol | 7% by mass |
| Surfactant (SFN465) | 1.5% by mass |
| $LiOH \cdot H_2O$ | 0.006% by mass |
| Tetramethyl ammonium hydroxide | 0.01% by mass |
| NaOH | 0.005% by mass |
| Water | balance |

The desired ink is obtained by filtrating a liquid obtained by mixing and agitating the above-mentioned composition using a 5 μm filter. The ink has viscosity of 3.9 mPa·s; surface tension of 31 mN/m; pH value of 7.5; SP value of 19.2 of a solvent; molar ratio of 1:1.6 between lithium ion and the other cation(s); and 0.025% by mass of a content of lithium ion relative to a content of the pigment [lithium ion (mass)/pigment (mass)].

Example 18

<Ink Preparation>

| | |
|---|---|
| Pigment | 20% by mass |
| Styrene-methyl acrylate copolymer | 6% by mass |
| (weight average molecular weight: 3,800, acidic value: 60, neutralization degree: 30) | |
| Glycerine | 20% by mass |
| Diethylene glycol | 15% by mass |
| Surfactant (SFN465) | 1.5% by mass |
| $LiOH \cdot H_2O$ | 0.001% by mass |
| NaOH | 0.077% by mass |
| Water | balance |

The desired ink is obtained by filtrating a liquid obtained by mixing and agitating the above-mentioned composition using a 5 μm filter. The ink has viscosity of 23 mPa·s; surface tension of 32 mN/m; pH value of 7.2; SP value of 17.9 of a solvent; molar ratio of 1:80.7 between lithium ion and the other cation(s); and 0.00083% by mass of a content of lithium ion relative to a content of the pigment [lithium ion (mass)/pigment (mass)].

Example 19

<Ink Preparation>

| | |
|---|---|
| Pigment | 5% by mass |
| Styrene-acrylic acid copolymer | 1% by mass |
| (weight average molecular weight: 4,500, acidic value: 110, neutralization degree: 60) | |
| Glycerine | 20% by mass |
| Diethylene glycol | 10% by mass |
| 1,2-hexane diol | 10% by mass |

-continued

| | |
|---|---|
| Surfactant (SFN465) | 1% by mass |
| $LiOH \cdot H_2O$ | 0.1% by mass |
| KOH | 0.047% by mass |
| Water | balance |

The desired ink is obtained by filtrating a liquid obtained by mixing and agitating the above-mentioned composition using a 5 μm filter. The ink has viscosity of 4.7 mPa·s; surface tension of 33 mN/m; pH value of 7.3; SP value of 17.1 of a solvent; molar ratio of 2.8:1 between lithium ion and the other cation(s); and 0.331% by mass of a content of lithium ion relative to a content of the pigment [lithium ion (mass)/pigment (mass)].

Example 20

<Ink Preparation>

| | |
|---|---|
| Pigment | 5% by mass |
| Styrene-acrylic acid copolymer | 1% by mass |
| (weight average molecular weight: 4,500, acidic value: 110, neutralization degree: 60) | |
| Glycerine | 20% by mass |
| Diethylene glycol | 10% by mass |
| 1,2-hexane diol | 10% by mass |
| Surfactant (SFN465) | 1% by mass |
| $LiOH \cdot H_2O$ | 0.1% by mass |
| Di-2-isopropanol amine | 0.1% by mass |
| Water | balance |

The desired ink is obtained by filtrating a liquid obtained by mixing and agitating the above-mentioned composition using a 5 μm filter. The ink has viscosity of 4.9 mPa·s; surface tension of 32 mN/m; pH value of 7.1; SP value of 17.1 of a solvent; molar ratio of 3.1:1 between lithium ion and the other cation(s); and 0.331% by mass of a content of lithium ion relative to a content of the pigment [lithium ion (mass)/pigment (mass)].

Comparative Example 1

<Ink Preparation>

| | |
|---|---|
| Self-dispersible pigment | 4% by mass |
| Glycerine | 20% by mass |
| Ethylene glycol | 10% by mass |
| Diethylene glycol monobutyl ether | 4% by mass |
| Surfactant (SFN465) | 1% by mass |
| $LiOH \cdot H_2O$ | 1.5% by mass |
| Water | balance |

The desired ink is obtained by filtrating a liquid obtained by mixing and agitating the above-mentioned composition using a 5 μm filter. The ink has viscosity of 5.2 mPa·s; surface tension of 33 mN/m; pH value of 11.4; SP value of 18.2 of a solvent; and 6.202% by mass of a content of lithium ion relative to a content of the pigment [lithium ion (mass)/pigment (mass)].

Comparative Example 2

<Ink Preparation>

| | |
|---|---|
| Self-dispersible pigment | 12% by mass |
| Glycerine | 20% by mass |
| Ethylene glycol | 10% by mass |
| Diethylene glycol monobutyl ether | 4% by mass |
| Surfactant (SFN465) | 1% by mass |
| LiOH.H$_2$O | 0.7% by mass |
| Water | balance |

The desired ink is obtained by filtrating a liquid obtained by mixing and agitating the above-mentioned composition using a 5 μm filter. The ink has viscosity of 5.7 mPa·s; surface tension of 33 mN/m; pH value of 9.2; SP value of 18.2 of a solvent; and 0.965% by mass of a content of lithium ion relative to a content of the pigment [lithium ion (mass)/pigment (mass)].

Comparative Example 3

<Ink Preparation>

| | |
|---|---|
| Self-dispersible pigment | 12% by mass |
| Glycerine | 20% by mass |
| Ethylene glycol | 10% by mass |
| Diethylene glycol monobutyl ether | 4% by mass |
| Surfactant (SFN465) | 1% by mass |
| LiOH.H$_2$O | 0.0035% by mass |
| Water | balance |

The desired ink is obtained by filtrating a liquid obtained by mixing and agitating the above-mentioned composition using a 5 μm filter. The ink has viscosity of 5.5 mPa·s; surface tension of 33 mN/m; pH value of 8.8; SP value of 18.2 of a solvent; and 0.005% by mass of a content of lithium ion relative to a content of the pigment [lithium ion (mass)/pigment (mass)].

Comparative Example 4

<Ink Preparation>

| | |
|---|---|
| Pigment | 7.8% by mass |
| Styrene-acrylic acid copolymer | 1.8% by mass |
| (weight average molecular weight: 4,500, acidic value: 110, neutralization degree: 60) | |
| Diethylene glycol | 10% by mass |
| 1,2-hexane diol | 10% by mass |
| Surfactant (POE-2EH) | 1% by mass |
| Triethanol amine | 0.015% by mass |
| NaOH | 0.085% by mass |
| Water | balance |

The desired ink is obtained by filtrating a liquid obtained by mixing and agitating the above-mentioned composition using a 5 μm filter. The ink has viscosity of 4.8 mPa·s; surface tension of 31 mN/m; pH value of 7.8; SP value of 14.2 of a solvent.

TABLE 1

| | Example 1 | % by mass | Example 2 | % by mass | Example 3 | % by mass | Example 4 | % by mass |
|---|---|---|---|---|---|---|---|---|
| Pigment | Self-dispersible pigment | 12 | Pigment | 7.8 | Pigment | 7.8 | Pigment | 4 |
| Polymer | — | — | St-AA | 1.8 | St-AA | 1.8 | St-MAA | 1 |
| Molecular weight | — | — | 4500 | — | 4500 | — | 43000 | — |
| Acidic value | — | — | 110 | — | 110 | — | 220 | — |
| Neutralization degree | — | — | 60 | — | 35 | — | 95 | — |
| Solvent 1 | Gly | 20 | — | — | Gly | 20 | Gly | 28 |
| Solvent 2 | EG | 10 | DEG | 10 | EG | 10 | PG | 5 |
| Solvent 3 | BCBT | 4 | 1,2-HDL | 10 | BCBT | 4 | — | — |
| SP value | 18.2 | | 14.2 | | 18.2 | | 19.4 | |
| Surfactant | SFN465 | 1 | POE-2EH | 1 | SFN465 | 1 | SFN465 | 1.5 |
| Cation 1 | LiOH.H$_2$O | 0.02 | LiOH.H$_2$O | 0.04 | LiOH.H$_2$O | 0.03 | LiOH.H$_2$O | 0.006 |
| Cation 2 | NaOH | 0.11 | Triethanol amine | 0.015 | Triethanol amine | 0.015 | Tetramethyl ammonium hydroxide | 0.01 |
| Cation 3 | — | — | NaOH | 0.085 | NaOH | 0.049 | NaOH | 0.149 |
| Molar ratio (Li:other cation) | 1:5.8 | | 1:2.3 | | 1:1.9 | | 1:26.8 | |
| Li/pigment ratio (% by mass) | 0.028% | | 0.085% | | 0.064% | | 0.0248% | |
| Water | Ion exchange water | 52.87 | Ion exchange water | 69.35 | Ion exchange water | 55.36 | Ion exchange water | 60.48 |
| Ink physical property | | | | | | | | |
| Surface tension (mN/m) | 31 | | 33 | | 32 | | 31 | |
| Viscosity (mPa × s) | 4.2 | | 5.1 | | 5.8 | | 4.2 | |
| pH | 8.8 | | 7.4 | | 7.3 | | 8.2 | |

TABLE 2

|  | Example 5 | % by mass | Example 6 | % by mass | Example 7 | % by mass | Example 8 | % by mass |
|---|---|---|---|---|---|---|---|---|
| Pigment | Pigment | 24 | Pigment | 5 | Pigment | 10 | Pigment | 8.5 |
| Polymer | St-MAA | 6 | nBMA-MAA | 1.2 | St-MA | 2 | St-MAA | 1.8 |
| Molecular weight | 3800 | — | 6000 | — | 25000 | — | 33000 | — |
| Acidic value | 55 | — | 370 | — | 120 | — | 180 | — |
| Neutralization degree | 85 | — | 25 | — | 75 | — | 85 | — |
| Solvent 1 | Gly | 20 | Gly | 20 | Gly | 25 | Gly | 5 |
| Solvent 2 | DEG | 15 | PG | 5 | — | — | DGEO | 15 |
| Solvent 3 | — | — | BCBT | 4 | — | — | — | — |
| SP value | 17.9 | | 18.0 | | 20 | | 13.7 | |
| Surfactant | SFN465 | 1.5 | POE lauryl ether | 1 | SFN465 | 1 | POE-2EH | 1.2 |
| Cation 1 | $LiOH \cdot H_2O$ | 0.0075 | $LiOH \cdot H_2O$ | 0.383 | $LiOH \cdot H_2O$ | 0.16 | $LiOH \cdot H_2O$ | 0.216 |
| Cation 2 | Tetramethyl ammonium hydroxide | 0.25 | NaOH | 0.025 | NaOH | 0.015 | NaOH | 0.025 |
| Cation 3 | NaOH | 0.200 | — | — | — | — | — | — |
| Molar ratio (Li:other cation) | 1:43.3 | | 14.6:1 | | 10.1:1 | | 8.2:1 | |
| Li/pigment ratio (% by mass) | 0.0052% | | 1.27% | | 0.26% | | 0.42% | |
| Water | Ion exchange water | 33.24 | Ion exchange water | 63.39 | Ion exchange water | 61.83 | Ion exchange water | 68.26 |
| Ink physical property | | | | | | | | |
| Surface tension (mN/m) | 35 | | 30 | | 33 | | 31 | |
| Viscosity (mPa s) | 25 | | 4.2 | | 7.3 | | 6.1 | |
| pH | 7.2 | | 8.1 | | 7.5 | | 7.8 | |

TABLE 3

|  | Example 9 | % by mass | Example 10 | % by mass | Example 11 | % by mass | Example 12 | % by mass |
|---|---|---|---|---|---|---|---|---|
| Pigment | Self-dispersible pigment | 5 | Pigment | 5 | Self-dispersible pigment | 5 | Pigment | 5 |
| Polymer | — | — | St-AA | 1 | — | — | St-AA | 1 |
| Molecular weight | — | — | 4500 | — | — | — | 4500 | — |
| Acidic value | — | — | 110 | — | — | — | 110 | — |
| Neutralization degree | — | — | 60 | — | — | — | 60 | — |
| Solvent 1 | Gly | 20 | Gly | 20 | Gly | 20 | Gly | 20 |
| Solvent 2 | EG | 10 | DEG | 10 | EG | 10 | DEG | 10 |
| Solvent 3 | BCBT | 4 | 1,2-HDL | 10 | BCBT | 4 | 1,2-HDL | 10 |
| SP value | 18.2 | | 17.1 | | 18.2 | | 17.1 | |
| Surfactant | SFN465 | 1 | SFN465 | 1 | SFN465 | 1 | SFN465 | 1 |
| Cation 1 | $LiOH \cdot H_2O$ | 0.06 | $LiOH \cdot H_2O$ | 0.1 | $LiOH \cdot H_2O$ | 0.1 | $LiOH \cdot H_2O$ | 0.1 |
| Cation 2 | NaOH | 0.05 | NaOH | 0.067 | Triethanol amine | 0.1 | Diethanol amine | 0.1 |
| Cation 3 | — | — | — | — | — | — | — | — |
| Molar ratio (Li:other cation) | 1.1:1 | | 1.4:1 | | 3.6:1 | | 2.5:1 | |
| Li/pigment ratio (% by mass) | 0.198% | | 0.331% | | 0.331% | | 0.331% | |
| Water | Ion exchange water | 59.89 | Ion exchange water | 52.83 | Ion exchange water | 59.8 | Ion exchange water | 52.80 |
| Ink physical property | | | | | | | | |
| Surface tension (mN/m) | 31 | | 33 | | 31 | | 33 | |
| Viscosity (mPa s) | 4.2 | | 4.8 | | 4.4 | | 5.1 | |
| pH | 8.8 | | 7.4 | | 8.6 | | 73 | |

TABLE 4

|  | Example 13 | % by mass | Example 14 | % by mass | Example 15 | % by mass | Example 16 | % by mass |
|---|---|---|---|---|---|---|---|---|
| Pigment | Self-dispersible pigment | 27.5 | Pigment | 0.8 | Pigment | 7.8 | Pigment | 4 |
| Polymer | — | — | St-AA | 0.2 | St-AA | 1.8 | St-MAA | 1 |
| Molecular weight | — | — | 4500 | — | 2500 | — | 52000 | — |

TABLE 4-continued

|  | Example 13 | % by mass | Example 14 | % by mass | Example 15 | % by mass | Example 16 | % by mass |
|---|---|---|---|---|---|---|---|---|
| Acidic value | — | | 110 | | 450 | | 220 | |
| Neutralization degree | — | | 60 | | 105 | | 95 | |
| Solvent 1 | Gly | 2 | — | | Gly | 20 | Gly | 28 |
| Solvent 2 | EG | 5 | DEG | 10 | EG | 10 | PG | 7 |
| Solvent 3 | BCBT | 20 | 1,2-HDL | 7.5 | BCBT | 4 | — | |
| SP value | 12.6 | | 14.3 | | 18.2 | | 19.2 | |
| Surfactant | SFN465 | 1 | POE-2EH | 1 | SFN465 | 1 | SFN465 | 1.5 |
| Cation 1 | LiOH.H$_2$O | 0.5 | LiOH.H$_2$O | 0.15 | LiOH.H$_2$O | 0.05 | LiOH.H$_2$O | 0.006 |
| Cation 2 | — | | Tetramethyl ammonium hydroxide | 0.015 | Tetramethyl ammonium hydroxide | 0.01 | Tetramethyl ammonium hydroxide | 0.01 |
| Cation 3 | NaOH | 0.03 | NaOH | 0.009 | NaOH | 0.606 | NaOH | 0.149 |
| Molar ratio (Li:other cation) | 15.9:1 | | 10.65:1 | | 1:12.8 | | 1:26.8 | |
| Li/pigment ratio (% by mass) | 0.301% | | 3.101% | | 0.106% | | 0.025% | |
| Water | Ion exchange water | 44 | Ion exchange water | 80.34 | Ion exchange water | 55.34 | Ion exchange water | 58.48 |
| Ink physical property | | | | | | | | |
| Surface tension (mN/m) | 35 | | 31 | | 32 | | 31 | |
| Viscosity (mPa s) | 28 | | 2.3 | | 5.6 | | 10.2 | |
| pH | 7.8 | | 8.2 | | 7.9 | | 7.5 | |

TABLE 5

|  | Example 17 | % by mass | Example 18 | % by mass | Example 19 | % by mass | Example 20 | % by mass |
|---|---|---|---|---|---|---|---|---|
| Pigment | Pigment | 4 | Pigment | 20 | Pigment | 5 | Pigment | 5 |
| Polymer | St-MAA | 1 | St-MAA | 6 | St-AA | 1 | St-AA | 1 |
| Molecular weight | 7500 | | 3800 | | 4500 | | 4500 | |
| Acidic value | 45 | | 60 | | 110 | | 110 | |
| Neutralization degree | 15 | | 30 | | 60 | | 60 | |
| Solvent 1 | Gly | 28 | Gly | 20 | Gly | 20 | Gly | 20 |
| Solvent 2 | PG | 7 | DEG | 15 | DEG | 10 | DEG | 10 |
| Solvent 3 | — | | — | | 1,2-HDL | 10 | 1,2-HDL | 10 |
| SP value | 19.2 | | 17.9 | | 17.1 | | 17.1 | |
| Surfactant | SFN465 | 1.5 | SFN465 | 1.5 | SFN465 | 1 | SFN465 | 1 |
| Cation 1 | LiOH.H$_2$O | 0.006 | LiOH.H$_2$O | 0.001 | LiOH.H$_2$O | 0.1 | LiOH.H$_2$O | 0.1 |
| Cation 2 | Tetramethyl ammonium hydroxide | 0.01 | — | | — | | Di-2-isopropanol amine | 0.1 |
| Cation 3 | NaOH | 0.005 | NaOH | 0.077 | KOH | 0.047 | — | |
| Molar ratio (Li:other cation) | 1:1.6 | | 1:80.7 | | 2.8:1 | | 3.1:1 | |
| Li/pigment ratio (% by mass) | 0.025% | | 0.00083% | | 0.331% | | 0.331% | |
| Water | Ion exchange water | 58.48 | Ion exchange water | 37.50 | Ion exchange water | 52.90 | Ion exchange water | 52.80 |
| Ink physical property | | | | | | | | |
| Surface tension (mN/m) | 31 | | 32 | | 33 | | 32 | |
| Viscosity (mPa s) | 3.9 | | 23 | | 4.7 | | 4.9 | |
| pH | 7.5 | | 7.2 | | 7.3 | | 7.1 | |

TABLE 6

|  | Comparative Example 1 | % by mass | Comparative Example 2 | % by mass | Comparative Example 3 | % by mass | Comparative Example 4 | % by mass |
|---|---|---|---|---|---|---|---|---|
| Pigment | Self-dispersible pigment | 4 | Self-dispersible pigment | 12 | Self-dispersible pigment | 12 | Pigment | 7.8 |
| Polymer | — | | — | | — | | St-AA | 1.8 |
| Molecular weight | — | | — | | — | | 4500 | |
| Acidic value | — | | — | | — | | 110 | |
| Neutralization degree | — | | — | | — | | 60 | |
| Solvent 1 | Gly | 20 | Gly | 20 | Gly | 20 | — | |
| Solvent 2 | EG | 10 | EG | 10 | EG | 10 | DEG | 10 |
| Solvent 3 | BCBT | 4 | BCBT | 4 | BCBT | 4 | 1,2-HDL | 10 |

TABLE 6-continued

|  | Comparative Example 1 | % by mass | Comparative Example 2 | % by mass | Comparative Example 3 | % by mass | Comparative Example 4 | % by mass |
|---|---|---|---|---|---|---|---|---|
| SP value |  | 18.2 |  | 18.2 |  | 18.2 |  | 14.2 |
| Surfactant | SFN465 | 1 | SFN465 | 1 | SFN465 | 1 | POE-2EH | 1 |
| Cation 1 | LiOH.H$_2$O | 1.5 | LiOH.H$_2$O | 0.7 | LiOH.H$_2$O | 0.0035 | LiOH.H$_2$O | 0 |
| Cation 2 | — | — | — | — | — | — | Triethanol amine | 0.015 |
| Cation 3 | — | — | — | — | — | — | NaOH | 0.085 |
| Molar ratio (Li:other cation) |  | — |  | — |  | — |  | — |
| Li/pigment ratio (% by mass) |  | 6.202% |  | 0.965% |  | 0.005% |  | 0.000% |
| Water | Ion exchange water | 59.5 | Ion exchange water | 52.3 | Ion exchange water | 52.9965 | Ion exchange water | 69.39 |
| Ink physical property |  |  |  |  |  |  |  |  |
| Surface tension (mN/m) |  | 33 |  | 33 |  | 33 |  | 31 |
| Viscosity (mPa s) |  | 5.2 |  | 5.7 |  | 5.5 |  | 4.8 |
| pH |  | 11.4 |  | 9.2 |  | 8.8 |  | 7.8 |

In the tables, the St-AA added as the dispersant polymer represents a styrene-acrylic acid copolymer; the St-MAA represents a styrene-methyl acrylic acid copolymer; the nBMA-MAA represents an n-butyl methacrylate-methyl acrylic acid copolymer, and the St-MA represents a styrene methacrylic acid copolymer.

The molecular weight of the dispersant polymer in the tables represents the weight average molecular weight measured by the above-mentioned method, and the acidic value and the neutralization degree represent the values measured by the above-mentioned method.

The Gly added as the water-soluble organic solvent is a glycerine (manufactured by Wako Pure Chemical Industries, Ltd.); the EG is an ethylene glycol (manufactured by Wako Pure Chemical Industries, Ltd.); the BCBT is a diethylene glycol monobutyl ether (manufactured by Wako Pure Chemical Industries, Ltd.); the DEG is a diethylene glycol (manufactured by Wako Pure Chemical Industries, Ltd.); the 1,2-HDL is a 1,2-hexanediol (manufactured by Degussa Corp.); the PG is a propylene glycol (manufactured by Wako Pure Chemical Industries, Ltd.); and the DGEO is a diglycerine ethylene oxide adduct (manufactured by Sakamoto Yakuhin Kogyo, Co., Ltd. product name: SC-E750).

The SFN 465 added as the surfactant is manufactured by Nisshin Chemical Industry Co., Ltd and the product name is Olfin E1010; the POE-2EH is manufactured by Aoki Oil Industrial Co., Ltd and the product name is EH-11; and the EPO lauryl ether is manufactured by Kao Corp. and the product name is Emargen 108.

The "self-dispersible pigment" is a pigment obtained by subjecting the C. I. Pigment Blue 15-3 to a surface modification; and the "pigment" is a pigment manufactured by Cabot Corp. by the product name of black Pearls L.

<Physical Property of the Ink>

The physical properties of the obtained inks are examined in accordance with the following methods. The results are shown in the above-mentioned tables 1 to 6.

—Surface Tension—

The surface tension of the obtained inks is measured using a Wilhelmie-type surface tension meter (manufactured by Kyowa Interface Science Co., Ltd.) in the environment of 23±0.5° C. and 55±5% RH.

—Viscosity—

The viscosity of the obtained inks is measured using Reomat 115 (manufactured by Contraves). The measurement is carried out on the inks placed in a measurement container to be mounted on the device by a predetermined method, under the condition of 23° C. measurement temperature and 1,400 s-1 shearing speed.

—pH Value—

The pH of the obtained inks is measured using a pH/Conductivity Meter MPC227 (manufactured by Mettler Toledo Corp.) in the environment of 23±0.5° C., 55±5% RH.

<Initial Ejection Property>

To examine the initial ejection property, the inks prepared by the above-mentioned method are set in a printer having a test piezoelectric-inkjet head with a nozzle density of 1,200 dpi×600 dpi. After carrying out a maintenance operation in accordance with a prescribed method, a nozzle check pattern is printed out to count the number of the nozzles which eject the ink out of the 1,024 nozzles. The application amount per drop of the ink to be ejected is adjusted to approximately 2 ng.

The evaluation criteria are as follows:

A: More than 95% nozzles (more than 973 nozzles) eject the ink.

B: 90 to 95% nozzles (922 to 973 nozzles) eject the ink.

C: Less than 90% nozzles (less than 922 nozzles) eject the ink.

<Number of the Nozzles which Eject the Ink after Long-Term Storage>

The inks prepared by the above-mentioned method are set in a printer having a test piezoelectric-inkjet printing head with a nozzle density of 1,200 dpi×600 dpi, and left for 15 days with the caps on under an ordinary environment. After carrying out a maintenance operation in accordance with a prescribed method, a nozzle-check-pattern is printed out to count the number of the nozzles which eject the ink, out of the 1,024 nozzles.

The evaluation criteria are as follows:

A: More than 95% nozzles (more than 973 nozzles) eject the ink.

B: 90 to 95% nozzles (922 to 973 nozzles) eject the ink.

C: Less than 90% nozzles (less than 922 nozzles) eject the ink.

<Number of Nozzles which Eject the Ink in the Right Direction after Long-Term Storage>

The inks prepared by the above-mentioned method are set in a printer having a test piezoelectric-inkjet head with a nozzle density of 1,200 dpi×600 dpi, and left for 15 days with the caps on under an ordinary environment. After carrying out a maintenance operation in accordance with a prescribed method, a nozzle-check-pattern is printed out to count the number of nozzles which eject the ink in the right direction, out of the 1,024 nozzles.

The evaluation criteria are as follows:
A: More than 95% nozzles (more than 973 nozzles) eject the ink in the right direction.
B: 90 to 95% nozzles (922 to 973 nozzles) eject the ink in the right direction.
C: Less than 90% nozzles (less than 922 nozzles) eject the ink in the right direction.

<Optical Density>

A solid image is printed out in accordance with the above-mentioned method in which ink after long-term storage is used, then its optical density is examined using an optical density measurement device X-Rite MODEL 404 (manufactured by X-Rite Corp.).

The evaluation criteria are as follows:
A: More than 1.5 optical density
B: 1.3 to 1.5 optical density
C: Less than 1.3 optical density <Evaluation Result Summary>

The evaluation results are summarized in Table 7.

As shown in table 7, Examples 1 to 20 using an ink containing two or more kinds of cation including a lithium ion exhibit excellent ejection property at the initial stage after the ink is prepared and in the course of long-term storage.

Example 21

<Processing Solution>

A desired processing solution is obtained by filtrating a liquid obtained by mixing and agitating the following composition with a 5 μm filter.

| | |
|---|---|
| Diethylene glycol | 30% by mass |
| Magnesium nitrate-hexahydrate | 4% by mass |
| Succinic acid | 2% by mass |
| Acetylene glycol ethylene oxide adduct | 1% by mass |
| Lithium hydroxide | 1% by mass |
| Ion exchange water | balance |

After the above-mentioned processing solution is applied, each ink of Examples 1 to 20 in the tables 1 to 5 is applied to form a 1-dot-wide linear image. The ratio of the amount between the processing solution and the ink to be ejected per area is 1:4 by mass. No beard-like blurring is observed in the obtained linear image according to the visual observation.

After the processing solution is applied, each ink of Examples 1 to 20 in the tables 1 to 5 is applied to form a solid image. The optical density of the obtained solid image is measured by an optical density measurement device, X-Rite

TABLE 7

| | Initial ejection property | After long-term storage | | Optical density (without processing solution) | Optical density (with processing solution) |
|---|---|---|---|---|---|
| | | No ejection disorder | No direction disorder | | |
| Example 1 | A(1024) | A(1023) | A(1018) | B | B |
| Example 2 | A(1024) | A(1024) | A(1021) | B | A |
| Example 3 | A(1024) | A(1024) | A(1020) | B | A |
| Example 4 | A(1024) | A(1024) | B(970) | B | A |
| Example 5 | A(1003) | A(1015) | A(982) | A | A |
| Example 6 | A(1015) | A(1020) | A(1024) | B | A |
| Example 7 | B(965) | A(1018) | A(970) | B | A |
| Example 8 | A(1024) | A(1024) | A(1024) | B | A |
| Example 9 | A(1024) | A(1024) | A(1024) | B | B |
| Example 10 | A(1024) | A(1024) | A(1024) | B | A |
| Example 11 | A(1024) | A(1024) | A(1024) | B | B |
| Example 12 | B(960) | A(1024) | A(1024) | B | A |
| Example 13 | A(1024) | A(1010) | B(965) | A | B |
| Example 14 | A(1024) | A(1024) | A(1024) | C | B |
| Example 15 | A(1024) | A(1018) | A(1005) | B | A |
| Example 16 | A(1008) | A(1002) | A(990) | B | A |
| Example 17 | A(1018) | A(995) | A(988) | B | A |
| Example 18 | A(1005) | A(991) | A(983) | B | A |
| Example 19 | A(1024) | A(1024) | A(1024) | B | A |
| Example 20 | A(1024) | A(1024) | A(1024) | B | A |
| Comparative Example 1 | C(902) | C(860) | C(880) | B | B |
| Comparative Example 2 | C(910) | B(945) | C(920) | B | B |
| Comparative Example 3 | A(1024) | C(880) | C(790) | B | B |
| Comparative Example 4 | A(1024) | C(905) | C(845) | B | A |

MODEL 404 (manufactured by X-Rite Corp). High optical density is observed, as shown in the table 7.

What is claimed is:

1. An ink containing at least a pigment, water, a water-soluble organic solvent, a lithium ion and one or more of cation other than the lithium ion, wherein the lithium ion is selected from a group consisting of a lithium hydroxide, a hydrate of a lithium hydroxide, a lithium acetate, a lithium benzoate, a lithium chloride, a lithium bromide, a lithium citrate, a lithium dihydrogen phosphate, a lithium lactate, a lithium nitrate, a lithium oxalate, a lithium salicylate, and a lithium tartrate, and the one or more of cation other than the lithium ion is a sodium hydroxide, or a tetramethylammonium hydroxide alone or in combination thereof.

2. The ink according to claim 1, wherein the molar ratio between the content of the lithium ion and the other cation is approximately 1:50 to approximately 15:1.

3. The ink according to claim 1, wherein the content of the lithium ion relative to the content of the pigment is approximately 0.001 to approximately 5% by mass.

4. The ink according to claim 1, wherein the content of the pigment relative to the total amount of the ink is approximately 1 to approximately 25% by mass.

5. The ink according to claim 1, wherein the content of the water relative to the total amount of the ink is approximately 30 to approximately 80% by mass.

6. The ink according to claim 1, wherein the surface tension of the ink is approximately 20 to approximately 40 mN/m.

7. The ink according to claim 1, further containing a polymer having a weight average molecular weight of approximately 3,000 to approximately 50,000, an acidic value of approximately 50 to approximately 400, and a neutralization degree of approximately 20 to approximately 100%.

8. The ink according to claim 1, wherein the SP value of the water-soluble organic solvent when only one water-soluble organic solvent is included, or the SP value of a mixture of water-soluble organic solvents when a plurality of water-soluble organic solvents are included, is approximately 13 to approximately 25.

9. The ink according to claim 1, wherein the pigment is at least one selected from the group consisting of a self-dispersible pigment, a pigment dispersed using a polymer dispersant, and colored fine particles dispersed with a colored resin.

10. An ink set including at least the ink according to claim 1.

11. The ink set according to claim 10, wherein a processing solution containing an aggregating agent is included.

12. The ink set according to claim 11, wherein the aggregating agent is at least one selected from the group consisting of an organic acid, an inorganic electrolyte and an organic amine compound.

13. A recording method wherein the ink according to claim 1 is applied onto a recording medium by an inkjet method.

14. A recording method wherein the ink set according to claim 10 is applied onto a recording medium by an inkjet method.

15. A recording method using the ink set according to claim 11, wherein the ink and the processing solution are applied so as to contact with each other to form a pattern or an image onto a recording medium.

16. The recording method according to claim 15, wherein the mass ratio between the amount of the ink and the processing solution to be applied onto a recording medium to form a pixel is in a range of approximately 1:20 to approximately 20:1.

17. An ink cartridge containing an ink containing at least a pigment, water, a water-soluble organic solvent, a lithium ion and one or more of cation other than the lithium ion, wherein the lithium ion is selected from a group consisting of a lithium hydroxide, a hydrate of a lithium hydroxide, a lithium acetate, a lithium benzoate, a lithium chloride, a lithium bromide, a lithium citrate, a lithium dihydrogen phosphate, a lithium lactate, a lithium nitrate, a lithium oxalate, a lithium salicylate, and a lithium tartrate, and the one or more of cation other than the lithium ion is a sodium hydroxide, or a tetramethylammonium hydroxide alone or in combination thereof, or the ink set according to claim 10.

18. A recording device comprising an ink ejector to eject the ink according to claim 1.

19. A recording device comprising an ink ejector to eject an ink of the ink set according to claim 11.

20. The recording device according to claim 18, wherein the ink ejector is in the form of inkjet method.

21. The recording device according to claim 18, wherein the amount of the ink to be applied onto a recording medium is approximately 0.01 to approximately 25 ng per drop.

22. The recording device according to claim 19, wherein the mass ratio between the amount of the ink and the processing solution to be applied onto a recording medium to form a pixel is in a range of approximately 1:20 to approximately 20:1.

* * * * *